United States Patent
Luo et al.

(10) Patent No.: US 11,989,637 B2
(45) Date of Patent: May 21, 2024

(54) SYSTEM AND METHOD FOR INVERTIBLE WAVELET LAYER FOR NEURAL NETWORKS

(71) Applicant: Samsung Electronics Co., Ltd., Suwon-si (KR)

(72) Inventors: Chenchi Luo, Plano, TX (US); David Liu, Plano, TX (US); Youngjun Yoo, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1114 days.

(21) Appl. No.: 16/399,998

(22) Filed: Apr. 30, 2019

(65) Prior Publication Data

US 2020/0349411 A1    Nov. 5, 2020

(51) Int. Cl.
*G06N 3/08* (2023.01)
*G06N 3/04* (2023.01)

(52) U.S. Cl.
CPC ............. *G06N 3/04* (2013.01); *G06N 3/0409* (2013.01); *G06N 3/08* (2013.01)

(58) Field of Classification Search
CPC .......... G06N 3/04; G06N 3/08; G06N 3/0409
See application file for complete search history.

(56) References Cited

U.S. PATENT DOCUMENTS

| | | |
|---|---|---|
| 7,783,074 B2 | 8/2010 | Shi et al. |
| 9,633,306 B2 | 4/2017 | Liu et al. |
| 2008/0123740 A1 | 5/2008 | Ye |
| 2015/0142837 A1 | 5/2015 | Lopez |
| 2017/0076438 A1 | 3/2017 | Kottenstette et al. |
| 2017/0116744 A1 | 4/2017 | Abedini et al. |
| 2018/0048917 A1 | 2/2018 | Metzler et al. |

FOREIGN PATENT DOCUMENTS

KR    10-2018-0010950 A    1/2018

OTHER PUBLICATIONS

Yang ("Deep Image Compression in the Wavelet Transform Domain Based on High Frequency Sub-Band Prediction") Digital Object Identifier 10.1109/ACCESS.2019.2911403 publication Apr. 16, 2019, (Year: 2019).*
Chen ("DPW-SDNet: Dual Pixel-Wavelet Domain Deep CNNs for Soft Decoding of JPEG-Compressed Images") Conference on Computer Vision and Pattern Recognition (CVPR) Workshops, 2018, pp. 711-720 (Year: 2018).*
Minarno ("Texture feature extraction using co-occurrence matrices of sub-band image for batik image classification") 2014 2nd International Conference on Information and Communication Technology (ICoICT) (Year: 2014).*

(Continued)

*Primary Examiner* — Kakali Chaki
*Assistant Examiner* — Su-Ting Chuang

(57) ABSTRACT

An electronic device, method, and computer readable medium for an invertible wavelet layer for neural networks are provided. The electronic device includes a memory and at least one processor coupled to the memory. The at least one processor is configured to receive an input to a neural network, apply a wavelet transform to the input at a wavelet layer of the neural network, and generate a plurality of subbands of the input as a result of the wavelet transform.

20 Claims, 15 Drawing Sheets

(56) References Cited

OTHER PUBLICATIONS

Li ("Discriminatively boosted image clustering with fully convolutional auto-encoders") Pattern Recognition 83 (2018) 161-173 (Year: 2018).*
Ye ("Deep convolutional framelets: A general deep learning framework for inverse problems") arXiv:1707.00372v5 [stat.ML] Jan. 25, 2018 (Year: 2018).*
Mao ("Image Restoration Using Convolutional Auto-encoders with Symmetric Skip Connections") arXiv:1606.08921v3 [cs.CV] Aug. 30, 2016 (Year: 2016).*
Yoo ("Photorealistic Style Transfer via Wavelet Transforms") arXiv:1903.09760v1 [cs.CV] Mar. 23, 2019 (Year: 2019).*
Makhzani ("Adversarial Autoencoders") arXiv:1511.05644v2 [cs.LG] May 25, 2016 (Year: 2016).*
Kumar ("Augmented Handwritten Devanagari digit recognition using Convolutional Autoencoder") Proceedings of the International Conference on Inventive Research in Computing Applications (ICIRCA 2018) (Year: 2018).*
Ronneberger ("U-Net: Convolutional Networks for Biomedical Image Segmentation") arXiv:1505.04597v1 [cs.CV] May 18, 2015 (Year: 2015).*
Sun ("Learning Sparse Representation With Variational Auto-Encoder for Anomaly Detection") Digital Object Identifier 10.1109/ACCESS.2018.2848210 (Year: 2018).*
Cong et al., "Minimizing Computation in Convolutional Neural Networks", Artificial Neural Networks and Machine Learning—ICANN 2014, Lecture Notes in Computer Science, vol. 8681, Sep. 2014, pp. 281-290.
Fujieda et al., "Wavelet Convolutional Neural Networks for Texture Classification", arXiv:1707.07394v1, Jul. 24, 2017, 9 pages.
Recoskie, et al., "Learning Sparse Wavelet Representations", arXiv:1802.02961v1, Feb. 8, 2018, 7 pages.
Peyré, Gabriel, "Wavelet Processing", Dec. 13, 2012, 88 pages (accessed at: https://www.slideshare.net/ gpeyre/signal-processing-course-wavelets).
Rangkuti, "Content Based Batik Image Classification Using Wavelet Transform and Fuzzy Neural Network", Journal of Computer Science, vol. 10, Issue 4, Apr. 2014, 10 pages.
Kim et al., "A Despeckling Method Using Stationary Wavelet Transform and Convolutional Neural Network", 2018 International Workshop on Advanced Image Technology (IWAIT), IEEE, May 2018, 4 pages.
International Search Report and Written Opinion of the International Searching Authority dated Apr. 2, 2020 in connection with International Patent Application No. PCT/KR2019/018048, 10 pages.

\* cited by examiner

SYSTEM AND METHOD FOR INVERTIBLE WAVELET LAYER FOR NEURAL NETWORKS

TECHNICAL FIELD

This disclosure relates generally to neural networks. More specifically, this disclosure relates to an invertible wavelet layer for neural networks.

BACKGROUND

Deep learning or deep neural networks is a revolutionary force in artificial intelligence. Neural Networks help computers make sense of infinite amounts of data in the form of images, sound, and text. Using multiple layers of neural perceptrons, computers now have the capacity to see, learn, and react to complex situations as well as if not better than humans.

A pooling layer is a key component in modern deep neural networks. The purpose of a pooling layer is to reduce the resolution of the feature maps so that as the network goes deeper, the same sized convolutional kernel can cover an increasingly larger receptive field in the input image. As a result, the neural network can have an increasingly global understanding of the image.

However, pooling is a lossy operation that wastes a large portion of previously computed values. For a typical deep neural network with five 2×2 max pooling layers, 99.9% of the computation of the neural network is discarded due to the pooling operation.

An upsampling layer is the reverse operation of pooling layer. An upsampling layer introduces either zeroes or interpolated values into the feature maps so that the following layers need to compute on top of feature maps with redundancies.

SUMMARY

This disclosure provides a system and method for an invertible wavelet layer for neural networks.

In one embodiment, an electronic device is provided. The electronic device includes a memory and at least one processor coupled to the memory. The at least one processor is configured to receive an input to a neural network, apply a wavelet transform to the input at a wavelet layer of the neural network, and generate a plurality of subbands of the input as a result of the wavelet transform.

In another embodiment, a method of a neural network is provided. The method comprises receiving an input to the neural network, applying a wavelet transform to the input at a wavelet layer of the neural network, and generating a plurality of subbands of the input as a result of the wavelet transform.

In another embodiment, a non-transitory computer readable medium embodying a computer program for operating an electronic device including a memory and at least one processor is provided. The computer program comprises computer readable program code that, when executed by the at least one processor, causes the electronic device to receive an input to a neural network, apply a wavelet transform to the input at a wavelet layer of the neural network, and generate a plurality of subbands of the input as a result of the wavelet transform.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
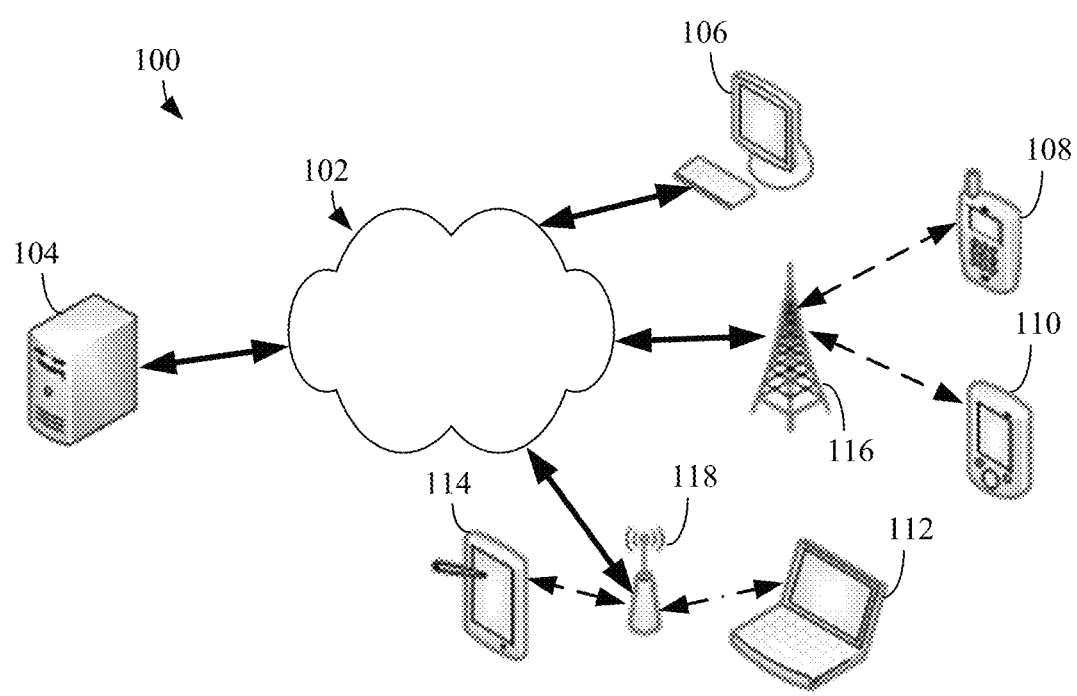
FIG. 1 illustrates an example communication system in accordance with embodiments of the present disclosure.

FIGS. 1 through 13B, discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged wireless communication system.

According to embodiments of the present disclosure, an invertible wavelet layer for improving neural networks is provided. Deep neural networks can perform various functions such as image recognition, data analysis, natural language processing, intent classification, or other functions. Neural networks can generate an output based on a weighted sum of inputs, which is then passed through an activation function. The activation function can provide an output after summing the inputs multiplied by the weights. It will be understood by those skilled in the art that various activation functions can be used depending on the configuration of the neural network and the result to be achieved by the neural network.

The inputs, weights, and outputs can be organized within a multilayer perceptron (MLP), wherein there is an input layer, one or more hidden layers, and an output layer. A plurality of inputs, or an input vector, make up the input layer, a plurality of hidden layer neurons reside in the hidden layer or layers, and one or more outputs can be generated for the output layer. The neural network can be a feedforward network where inputs are passed from the input layer to a hidden layer. The inputs can be processed through an activation or transfer function to provide new inputs to a next hidden layer, if the neural network has multiple hidden layers, from hidden layer to hidden layer until the final hidden layer passes the final outputs to the output layer. As a neural network is trained, the weights can be adjusted based on calculated error rates to increase the accuracy of the neural network.

Convolutional neural networks can be used for image or object recognition. A convolution layer performs convolutions between an image and a filter or kernel (a matrix of values) to weight sections of the image based on the kernel in order to emphasize features in the image. Convolutions can be performed on a subset of the image at a time until the full image is weighted by a kernel. Kernels using different weights can be used for additional convolutions, creating a feature map as a result of each convolution. Each feature map can then be passed to the next layer of the neural network. Other layers of a convolutional neural network can be batch normalization layers, or Bnorm layers, rectified linear units (ReLU) layers, pooling layers, or others. A convolutional neural network can perform any number of convolutions, batch normalizations, ReLU calculations, and pooling operations depending on the neural network. The image can be reduced down to a vector of values and a fully connected layer then takes the vector and provides one or more outputs, such as indicating whether the image matches a particular feature or object attempting to be detected. It will be appreciated that the present disclosure is not limited to any particular type of neural network and that this disclosure can be applied to any neural network.

The Bnorm layer can be used to normalize the activation of each convolution layer. The ReLU layer applies an activation function to increase the nonlinear properties of the network, such as by zeroing out negative values. The pooling layer downsamples images or feature maps to reduce the resolution of the feature maps so that, as the network goes deeper, the same sized kernel can be used to cover an increasingly larger receptive field, allowing for more efficient processing by subsequent layers. Max pooling is a common method of pooling that outputs the maximum value of a sub-region of an image or feature map. However, pooling is a lossy operation that wastes a large portion of previously computed values. For example, when using max pooling, only the highest value in a sub-region is retained, and all other values are discarded. For instance, in a 2×2 max pooling layer, out of four elements in the pooling window or sub-region, only one value is extracted and the other three are discarded, wasting 75% of the computations of the previous layers. For a neural network with five 2×2 pooling layers the resolution of the output feature map will be reduced by a factor of 1024 and $\frac{3}{4}(1+\frac{1}{4}+\frac{1}{4}^2+\frac{1}{4}^3+\frac{1}{4}^4)$, which is a 99.9% waste of computations because of the nature of how the pooling layer operates.

In some applications such as semantic segmentation, the input and output resolution of the neural network is the same. After the feature map resolution reduction process, a resolution restoration process is implemented using an upsampling layer and deconvolutional layers. The upsampling layer is the reverse operation of the pooling layer. For example, to implement a 2×2 upsampling layer, each element is duplicated 2×2 times or zeroes are inserted. The upsampling layer thus introduces redundant information into the neural network due to the lossy operation of the pooling layers in order to approximate the original image. The upsampling layers thus provide an image that is of lower quality than the original image. The present disclosure is directed to replacing pooling layers with wavelet layers and the upsampling layers with inverse wavelet layers to losslessly reduce and expand the resolution of the feature maps. Since the wavelet and inverse wavelet layers are lossless and invertible, no computations from the previous layers are wasted. When combining wavelet and inverse wavelet layers, an auxiliary auto-encoder structure can be implemented along with deep neural networks to visualize the network's learned knowledge.

FIG. 1 illustrates an example system 100 according to embodiments of this disclosure. The embodiment of the system 100 shown in FIG. 1 is for illustration only. Other embodiments of the system 100 could be used without departing from the scope of this disclosure.

The system 100 includes a network 102 that facilitates communication between various components in the system 100. For example, network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

The network 102 facilitates communications between various server(s) 104 and various client devices 106-114. Server 104 can represent one or more servers. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or mobile devices 108 (such as a smartphone), a personal digital assistant (PDA) 110, a laptop computer 112, and a tablet computer 114. However, any other or additional client devices could be used in the system 100.

In this example, some client devices 108-114 communicate indirectly with the network 102. For example, the client devices 108 and 110 (mobile devices 108 and PDA 110, respectively) communicate via one or more base stations 116, such as cellular base stations or eNodeBs (eNBs). Mobile devices 108 include both smart phones and feature phones. Smart phones represent a class of mobile devices 108 that are a handheld device with a mobile operating system and an integrated mobile broadband cellular network connection for voice, short message service (SMS), and internet data communication. Feature phones represent a class of mobile devices 108 that are a midway point between a basic phone and a smart phone. Feature phones generally have voice calling and text messaging functions in addition to basic multimedia and internet capabilities. Also, the client devices 112 and 114 (laptop computer and tablet computer, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

In certain embodiments, the mobile device 108 (or any other client device 106-114) can transmit information securely and efficiently to another device, such as, for example, the server 104. The mobile device 108 (or any other client device 106-114) can receive information to be processed as an input(s) into a neural network. Such information can include image data, voice/audio data, geolocation data, user information, or other data received by or stored on the mobile device 108. The mobile device 108 (or any other client device 106-114) can trigger the information transmission between itself and server 104. The mobile device 108 (or any other client device 106-114) can provide a real-time result generated by a neural network.

Although FIG. 1 illustrates one example of a system 100, various changes can be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow for a client device or a server to provide a result processed by a neural network. In certain embodiments, a client device (client device 106-114) can determine the neural network result. In certain embodiments, a client device (client device 106-114) receives the data to be included as inputs into a neural network and transmits the data over the network 102 to the server 104, which determines the output(s) using the neural network.

Figure 2:
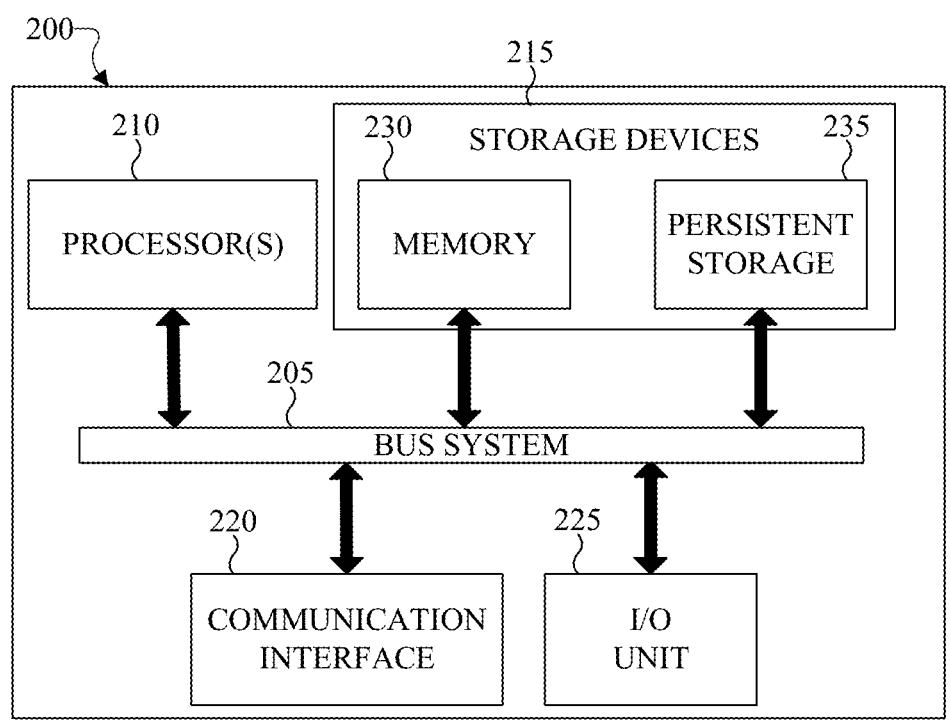
FIG. 2 illustrates an example electronic device server in accordance with embodiments of the present disclosure.
Figure 3:
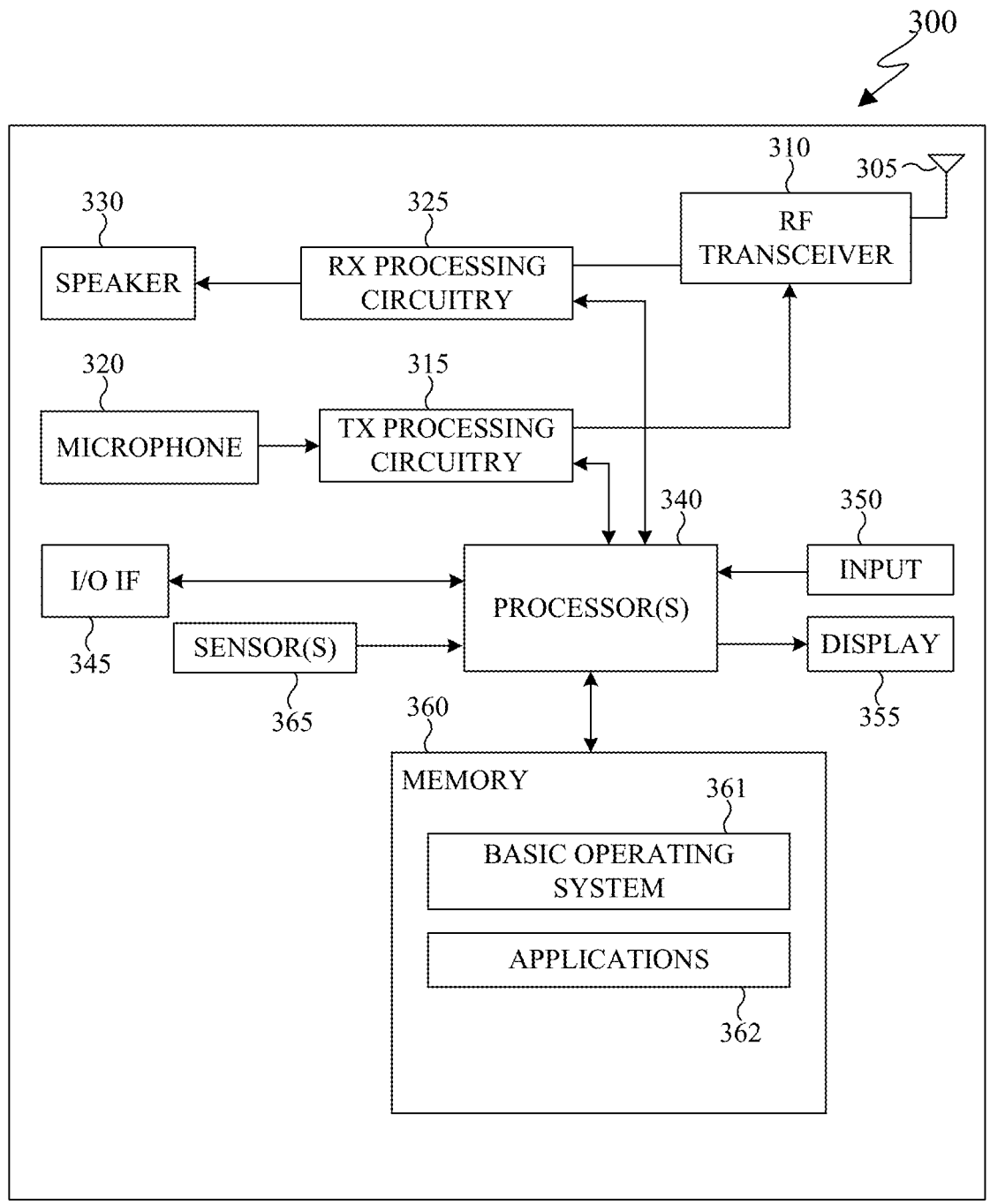
FIG. 3 illustrates an example electronic device in accordance with embodiments of the present disclosure.

FIGS. 2 and 3 illustrate example devices in a computing system in accordance with embodiments of the present disclosure. In particular, FIG. 2 illustrates an example server 200, and FIG. 3 illustrates an example electronic device 300. The server 200 could represent the server 104 in FIG. 1, and the electronic device 300 could represent one or more of the client devices 106-114 in FIG. 1.

Server 200 can represent one or more local servers or one or more neural network servers for processing received inputs through a trained neural network. As shown in FIG. 2, the server 200 includes a bus system 205 that supports communication between at least one processor(s) 210, at least one storage device(s) 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processor(s) 210 include microprocessors, microcontrollers, digital signal processors, field programmable gate arrays, application specific integrated circuits, and discreet circuitry.

The memory 230 and a persistent storage 235 are examples of storage devices 215 that represent any structure(s) capable of storing and facilitating retrieval of information (such as data, program code, neural network inputs and other data, or other suitable information on a temporary or permanent basis). The memory 230 can represent a random access memory or any other suitable volatile or non-volatile storage device(s). The persistent storage 235 can contain one or more components or devices supporting longer-term storage of data, such as a ready only memory, hard drive, Flash memory, or optical disc.

The communications interface 220 supports communications with other systems or devices. For example, the communications interface 220 could include a network interface card or a wireless transceiver facilitating communications over the network 102. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device.

Note that while FIG. 2 is described as representing the server 104 of FIG. 1, the same or similar structure could be used in one or more of the various client devices 106-114. For example, a desktop computer 106 or a laptop computer 112 could have the same or similar structure as that shown in FIG. 2.

FIG. 3 illustrates an electronic device 300 in accordance with an embodiment of this disclosure. The embodiment of the electronic device 300 shown in FIG. 3 is for illustration only and other embodiments could be used without departing from the scope of this disclosure. The electronic device 300 can come in a wide variety of configurations, and FIG. 3 does not limit the scope of this disclosure to any particular implementation of an electronic device. In certain embodiments, one or more of the devices 104-114 of FIG. 1 can include the same or similar configuration as electronic device 300.

In certain embodiments, the electronic device 300 is useable with data transfer applications, such as providing neural network inputs or activating a function based on a neural network result or output. For example, the electronic device 300 can receive information, such as voice data, transfer the data to the server 200, receive a response from the server 200 indicating the result of processing the information through a neural network, and activate a function on the electronic device 300 in accordance with the result. The electronic device 300 can be a mobile communication device, such as, for example, a wireless terminal, a desktop computer (similar to desktop computer 106 of FIG. 1), a mobile device (similar to mobile device 108 of FIG. 1), a PDA (similar to PDA 110 of FIG. 1), a laptop (similar to laptop computer 112 of FIG. 1), a tablet (similar to tablet computer 114), and the like.

As shown in FIG. 3, the electronic device 300 includes an antenna 305, a communication unit 310, a transmit (TX) processing circuitry 315, a microphone 320, and a receive (RX) processing circuitry 325. The communication unit 310 can include, for example, a RF transceiver, a BLUETOOTH transceiver, a WI-FI transceiver, ZIGBEE, infrared, and the like. The electronic device 300 also includes a speaker 330, a processor 340, an input/output (I/O) interface 345, an input 350, a display 355, a memory 360, a sensor(s) 365, and a biometric scanner 370. The memory 360 includes an operating system (OS) 361, applications 362, and user data 363.

The communication unit 310 receives, from the antenna 305, an incoming RF signal transmitted such as a BLUETOOTH or WI-FI signal from an access point (such as a base station, Wi-Fi router, Bluetooth device) of the network 102 (such as a Wi-Fi, Bluetooth, cellular, 5G, LTE, LTE-A, WiMAX, or any other type of wireless network). The communication unit 310 can down-convert the incoming RF signal to generate an intermediate frequency or baseband signal. The intermediate frequency or baseband signal is sent to the RX processing circuitry 325 that generates a processed baseband signal by filtering, decoding, or digitizing the baseband or intermediate frequency signal, or a combination thereof. The RX processing circuitry 325 transmits the processed baseband signal to the speaker 330 (such as for voice data) or to the processor 340 for further processing (such as for web browsing data and remittance).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, digitizes, or a combination thereof, the outgoing baseband data to generate a processed baseband or intermediate frequency signal. The communication unit 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices and execute the OS 361 stored in the memory 360 in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. The processor 340 is also capable of executing other applications 362 resident in the memory 360, such as, one or more applications for remittance, fraud detection, and the like.

The processor 340 can execute instructions that are stored in a memory 360. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discreet circuitry.

The processor 340 is also capable of executing other processes and programs resident in the memory 360, such as operations that receive, store, and timely instruct by providing image capturing and processing. The processor 340 can move data into or out of the memory 360 as required by an executing process. In some embodiments, the processor 340 is configured to execute plurality of applications 362 based on the OS 361 or in response to signals received from eNBs or an operator. The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. Input 350 can be a keyboard, touch screen, mouse, track ball, voice input, or other device capable of acting as a user interface to allow a user in interact with electronic device 300. For example, the input 350 can include voice recognition processing thereby allowing a user to input a voice command via microphone 320. For another example, the input 350 can include a touch panel, a (digital) pen sensor, a key, or an ultrasonic input device. The touch panel can recognize, for example, a touch input in at least one scheme among a capacitive scheme, a pressure sensitive scheme, an infrared scheme, or an ultrasonic scheme. Input 350 can be associated with sensor(s) and/or a camera 365 by providing additional input to processor 340. The camera can be used to capture images to be processed by a convolutional neural network. Such a convolutional neural network can be an application stored on the electronic device 300, or on the server 200, in which case the electronic device 300 can transmit a captured image to the server 200 to be processed by the neural network.

In certain embodiments, sensor 365 includes inertial sensors (such as, accelerometers, gyroscope, and magnetometer), optical sensors, motion sensors, cameras, pressure sensors, heart rate sensors, altimeter, breath sensors (such as microphone 320), and the like. The input 350 can also include a control circuit. In the capacitive scheme, the input 350 can recognize touch or proximity. The display 355 can be a liquid crystal display (LCD), light-emitting diode (LED) display, optical LED (OLED), active matrix OLED (AMOLED), or other display capable of rendering text and/or graphics, such as from websites, videos, games, images, and the like.

The memory 360 is coupled to the processor 340. Part of the memory 360 could include a random access memory (RAM), and another part of the memory 360 could include a Flash memory or other read-only memory (ROM).

The memory 360 can include persistent storage (not shown) that represents any structure(s) capable of storing and facilitating retrieval of information (such as data, program code, and/or other suitable information on a temporary or permanent basis). The memory 360 can contain one or more components or devices supporting longer-term storage of data, such as a ready only memory, hard drive, Flash memory, or optical disc. The memory 360 also can contain user data 363 that includes profile data and user history data. User data 363 can also contain data received from sensor 365. User data 363 can biographical and biometric data.

Electronic device 300 further includes one or more sensor(s) 365 that can meter a physical quantity or detect an activation state of the electronic device 300 and convert metered or detected information into an electrical signal. In certain embodiments, sensor 365 includes inertial sensors (such as accelerometers, gyroscopes, and magnetometers), optical sensors, motion sensors, cameras, pressure sensors, heart rate sensors, altimeter, breath sensors (such as microphone 320), and the like. For example, sensor 365 can include one or more buttons for touch input, (such as on a headset or the electronic device 300), a camera, a gesture sensor, a gyroscope or gyro sensor, an air pressure sensor, a magnetic sensor or magnetometer, an acceleration sensor or accelerometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an Infrared (IR) sensor, an ultrasound sensor, an iris sensor, a fingerprint sensor, and the like. The sensor 365 can further include a control circuit for controlling at least one of the sensors included therein. The sensor(s) 365 can be used to determine an orientation and facing direction, as well as geographic location of the electronic device 300. Any of these sensor(s) 365 can be located within the electronic device 300 or another electronic device in communication with the electronic device 300.

Although FIGS. 2 and 3 illustrate examples of devices in a computing system, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication networks, electronic devices and servers can come in a wide variety of configurations, and FIGS. 2 and 3 do not limit this disclosure to any particular electronic device or server.

Figure 4:
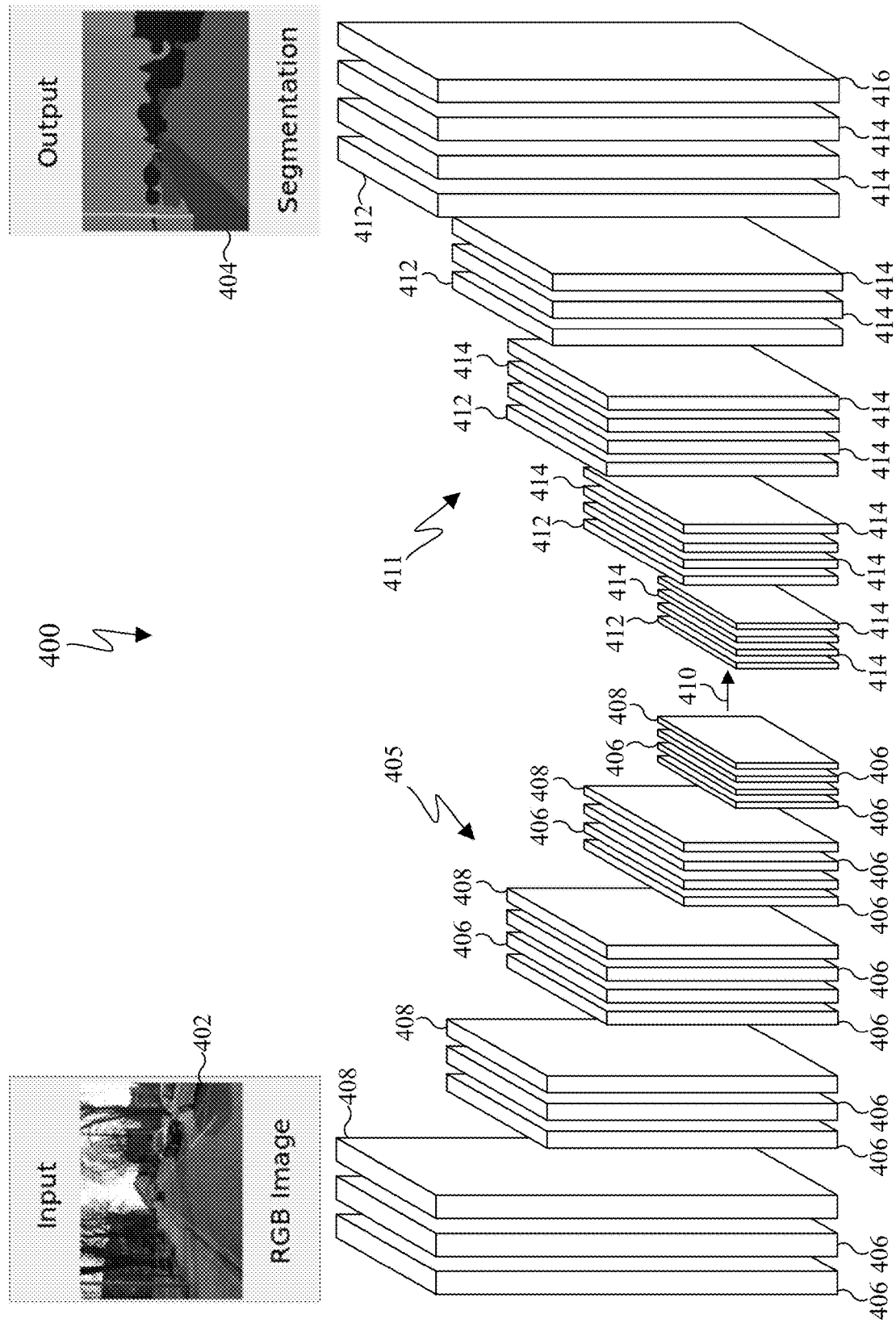
FIG. 4 illustrates a block diagram of an example convolutional neural network including wavelet layers in accordance with embodiments of the present disclosure.

FIG. 4 illustrates a block diagram of an example convolutional neural network 400 including wavelet layers in accordance with embodiments of the present disclosure. The processor 210 of the server 200 or the processor 340 of electronic device 300 can execute the neural network 400. Convolutional neural networks can include any number of convolutional layers, batch normalization or Bnorm layers, rectified linear units or ReLU layers, or other layers. In other neural networks, pooling layers are used to downsample the feature maps produced from the other previous layers. In the neural network illustrated in FIG. 4, the layers where the pooling layers would be located in other neural networks are replaced with wavelet layers. The wavelet layers losslessly reduce the size of feature maps. For processing by the next series of layers.

In the example illustrated in FIG. 4, the neural network 400 is a neural network for performing semantic segmentation. Semantic segmentation includes inputting an input image into a convolutional neural network to detect features in the image, upsampling the image back to its original size, and displaying a segmented image in which the features of the image are highlighted and differentiated. For example, as shown in FIG. 4, an RGB input image 402 is received by the processor. The processor passes the input image 402 through the neural network and returns the input image 402 to its original size as output image 404. In certain embodiments, the processor outputs the output image 404 with highlighted sections of different colors that differentiate the features detected in the image from other detected features.

The neural network 400 includes a series of convolutional layers 406 in a feature detection portion 405 of the neural network. For purposes of illustration, the convolutional layers 406 in FIG. 4 can also represent any number of Bnorm and/or ReLU layers. A wavelet layer 408 follows each set of convolutional layers 406 (including any Bnorm and/or ReLU layers). The processor at each wavelet layer 408 applies a wavelet transform to each image or feature map provided by the previous layers, until the features in the image 402 can be accurately detected. Once the processor reaches the final set of layers and can distinguish the features in the image 402, the features maps produced by the processor at the final layers are passed at reference numeral 410 to a segmentation portion 411 of the neural network 400. The first layer in the segmentation portion 411 of the neural network 400 is an inverse wavelet layer 412. The processor at the inverse wavelet layer 412 applies the inverse of the wavelet transform used in the previous wavelet layers 408 to begin restoring the image to the original resolution.

After the processor applies the inverse wavelet transform at the inverse wavelet layer 412, the feature maps are passed through another series of convolutional (or deconvolutional) layers 414, which may also include any number of Bnorm or ReLU layers. The processor continues this process, passing the feature maps through a series of inverse wavelet layers 412 and convolutional layers 414, which in some embodiments can be of the same number of convolutional layers 406 and wavelet layers 408 applied in the feature detection portion 405 of the neural network 400. Once the image is restored to its original resolution, the processor at a final activation function layer 416, such as a layer including a Softmax activation function or other functions, outputs the segmented output image 404.

Figure 5A:
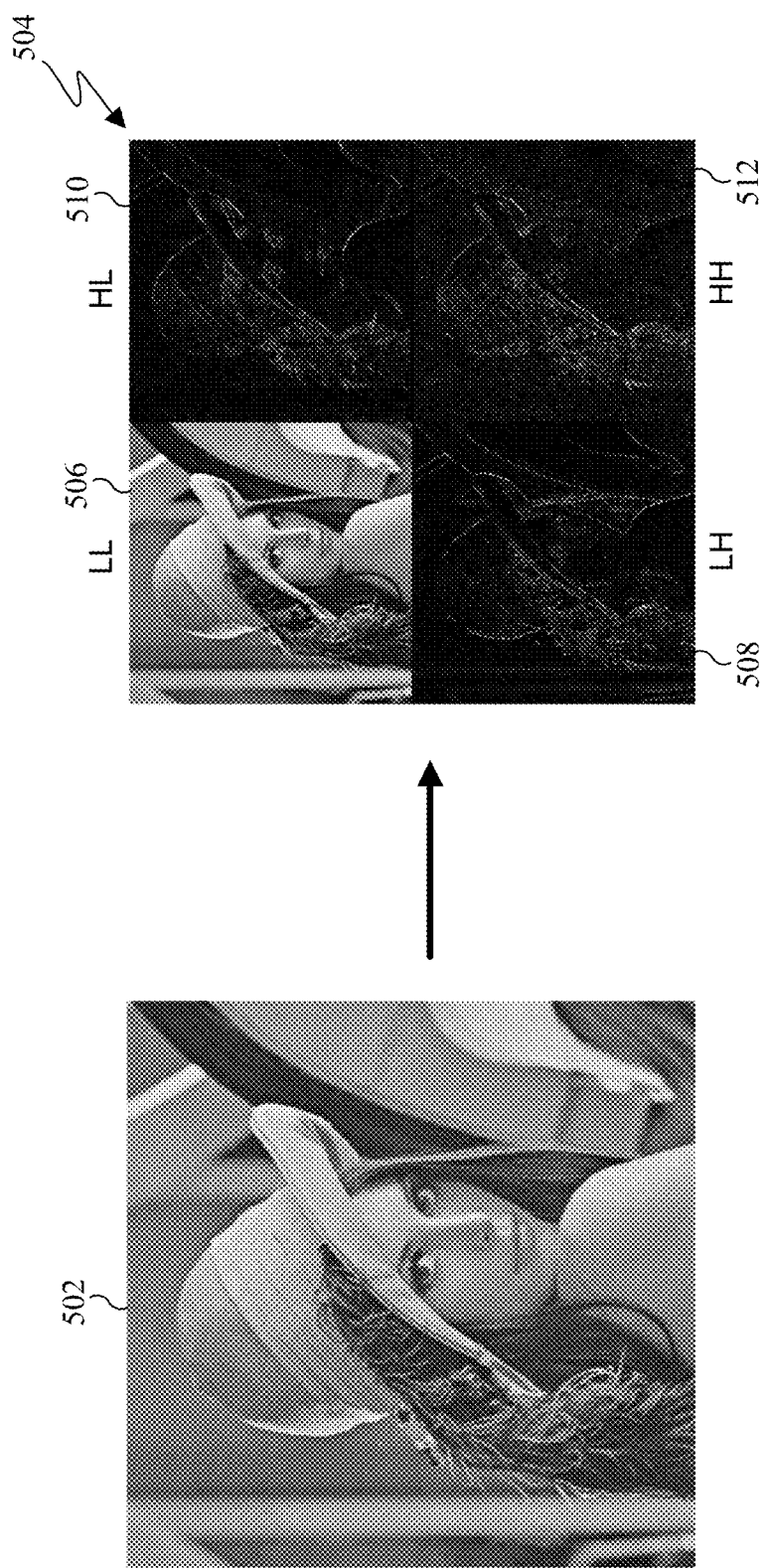
FIG. 5A illustrates an example wavelet input image and an example transformed image in accordance with embodiments of the present disclosure.
Figure 5B:
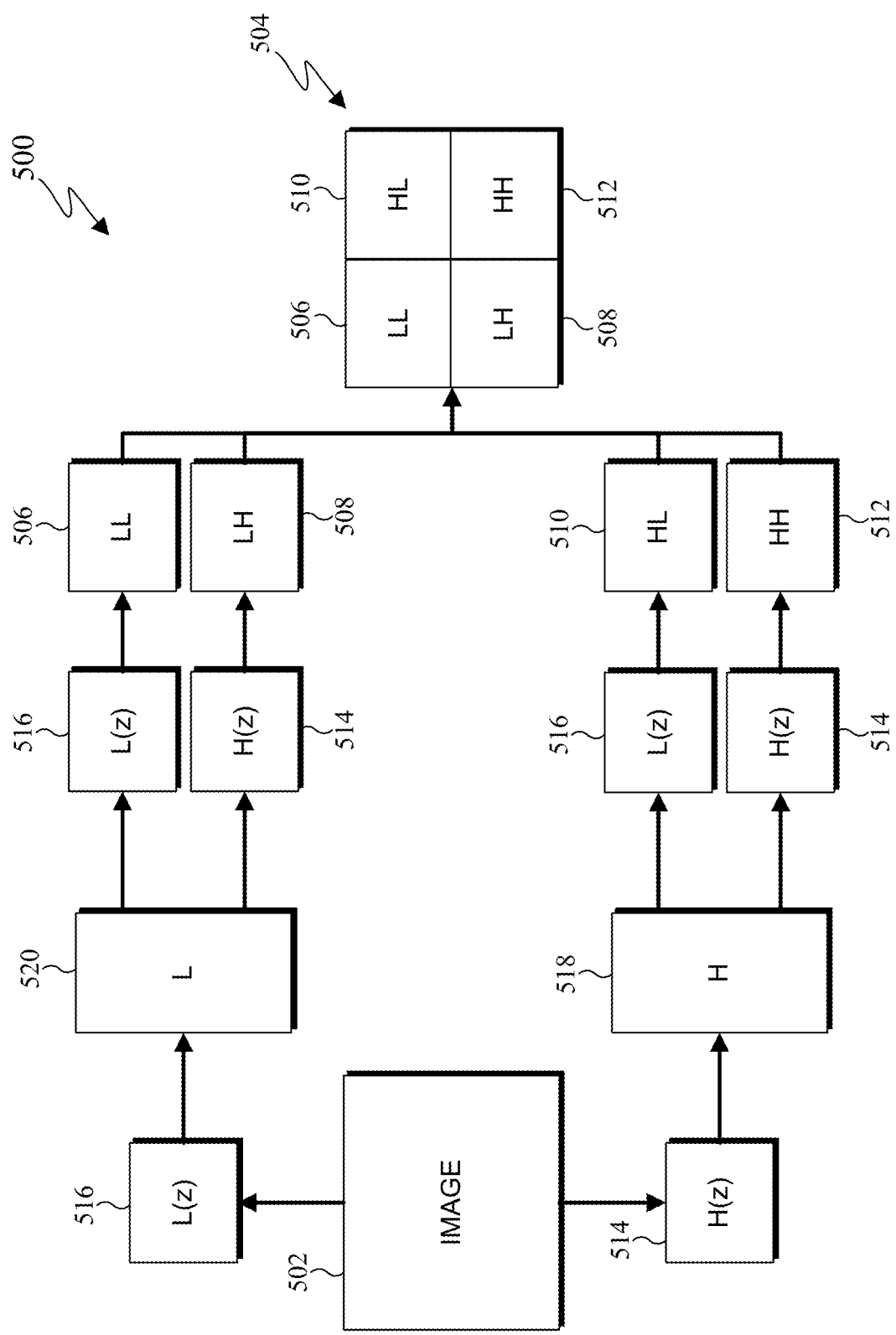
FIG. 5B illustrates a block diagram of an example wavelet transform process in accordance with embodiments of the present disclosure.

Referring now to FIGS. 5A and 5B, FIG. 5A illustrates an example wavelet input image 502 and an example transformed image 504 in accordance with embodiments of the present disclosure, and FIG. 5B illustrates a block diagram of an example wavelet transform process 500 in accordance with embodiments of the present disclosure. The processor 210 of the server 200 or the processor 340 of electronic device 300 can execute the wavelet transform process 500. It will be understood that there are a number of existing wavelet transforms, such as Haar, Daubechie, Mallot, and other wavelet transforms, and this disclosure is not limited to any single wavelet transform. The processor receives an image 502 to be transformed. For grayscale images, the processor can apply the wavelet transform to the image 502 to produce a transformed image 504. For color or RGB images, the processor can apply the wavelet transform to each color layer separately.

As one example, the processor can apply a Haar wavelet transform to the image 502. A Haar wavelet transform applies a series of operations on pixel values of an image, arranged in a matrix A. For example, if the first row of matrix A is $r_1$=(88 88 89 90 92 94 96 97), the Haar wavelet transform can group the columns in pairs, as follows: [88, 88], [89, 90], [92, 94], [96, 97]. The first four columns of $r_1$ are replaced by the average of each of these pairs (approximation coefficients), and the second four columns of $r_1$ are replaced by ½ the difference of these pairs (detail coefficients), such that $r_1h_1$=(88 89.5 93 96.5 0 −0.5 −1 −0.5). The processor repeats this process for the first four values of $r_1h_1$, while leaving the last four values alone, such that $r_1h_1h_2$= (88.75 94.75 −0.75 −1.75 0 −0.5 −1 −0.5). The processor then repeats this process on the first two values of $r_1h_1h_2$, while leaving the last six values alone, such that $r_1h_1h_2h_3$= (91.75 −3 −0.75 −1.75 0 −0.5 −1 −0.5). The processor performs this process on every row of the matrix, and then on every column of the matrix, outputting a compressed image.

The processor can also accomplish the transform by matrix multiplication using a defined transform matrix. Multiplying matrix A by the defined matrix can accomplish the previously described steps. For example, if matrix A is an 8×8 matrix, the transform matrix can be defined as $$H = \begin{bmatrix} 1/8 & 1/8 & 1/4 & 0 & 1/2 & 0 & 0 & 0 \\ 1/8 & 1/8 & 1/4 & 0 & -1/2 & 0 & 0 & 0 \\ 1/8 & 1/8 & -1/4 & 0 & 0 & 1/2 & 0 & 0 \\ 1/8 & 1/8 & -1/4 & 0 & 0 & -1/2 & 0 & 0 \\ 1/8 & -1/8 & 0 & 1/4 & 0 & 0 & 1/2 & 0 \\ 1/8 & -1/8 & 0 & 1/4 & 0 & 0 & -1/2 & 0 \\ 1/8 & -1/8 & 0 & -1/4 & 0 & 0 & 0 & 1/2 \\ 1/8 & -1/8 & 0 & -1/4 & 0 & 0 & 0 & -1/2 \end{bmatrix},$$

and the product of AH will be the wavelet transform applied to the rows of matrix A. To apply the wavelet transform to the columns, A is multiplied on the left side by $H^T$. Therefore, the entire process can be achieved by the product of $H^TAH$. This wavelet transform H is invertible, such that the original image values can be recreated by applying the inverse of this process to the transformed image. If $B=H^TAH$, then $A=(H^T)^{-1}MH^{-1}$, where B represents the transformed image of A. Since the transform H is invertible, the wavelet transform is lossless, and has an efficient implementation of N log N. Applying such a wavelet transform in place of pooling thus allows for calculations and data to be retained, whereas pooling would discard the data. It will be understood that this is but one example of a Haar wavelet transform for illustrative purposes, and any type of wavelet transform can be applied to the input image 502 without deviating from the present disclosure.

As shown in FIGS. 5A and 5B, the processor applies a two-dimensional discrete wavelet transform to separate the output image into four subbands, a low-low (LL) subband 506, a low-high (LH) subband 508, a high-low (HL) subband 510, and a high-high (HH) subband 512. The subbands are created by the process 500 illustrated in FIG. 5B. The processor receives the image 502 and applies both a high pass filter H(z) 514 and a low pass filter L(z) 516 to the image 502, each to the rows of the image 502. The high pass filter 514 produces a high subband section 518 of the image 502, and the low pass filter 516 produces a low subband section 520. For example, if the image 502 is an 8×8 image (H×W), the high subband section 518 and the low subband section 520 would be 8×4 images. The processor then applies the high pass filter 514 and the low pass filter 516 to the columns of the low subband section 520, resulting in the LL subband 506 and LH subband 508. The processor also applies the high pass filter 514 and the low pass filter 516 to the columns of the high subband section 518, resulting in the HL subband 510 and HH subband 512. Each of the subbands 506-512 are arranged in the image 504 as shown in FIGS. 5A and 5B. The quadrants 506-512 can be used as separate inputs for another layer of a neural network, the processor stacking the quadrants along the channel dimension. It will be understood that low and high pass filters could be applied to the columns first, to create 4×8 images, and then to the rows. This would result in the positions of the LH subband 508 and the HL subband 510 being switched in the image 504, but this would not affect the performance or operation of the wavelet neural networks described herein. It will also be understood that the low and high pass filters applied to the columns could be different filters from the filters applied to the image 502.

Figure 6:
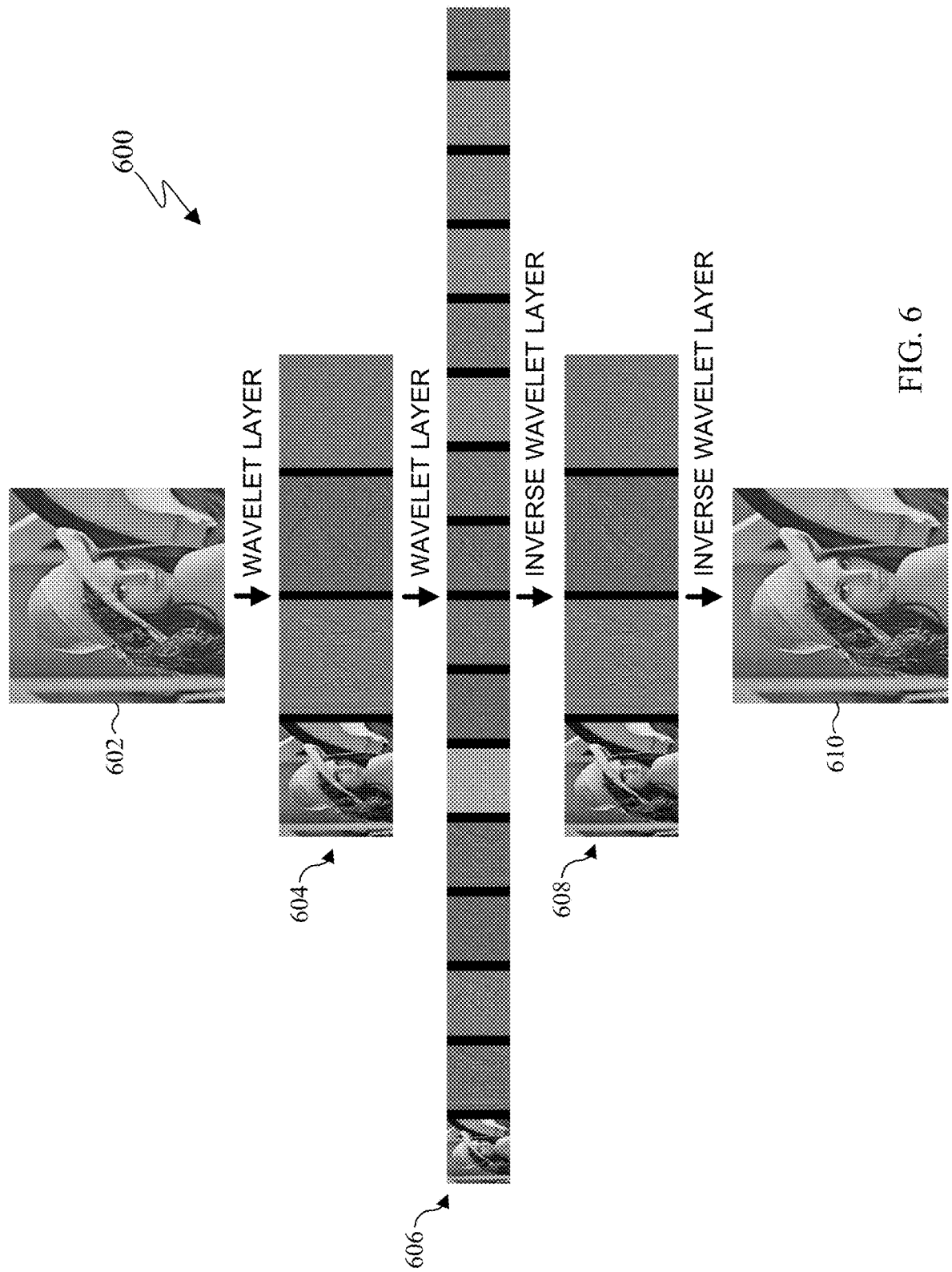
FIG. 6 illustrates an example series of wavelet and inverse wavelet layers in accordance with embodiments of the present disclosure.

FIG. 6 illustrates an example series of wavelet and inverse wavelet layers 600 in accordance with embodiments of the present disclosure. The wavelet and inverse wavelet layers 600 can be executed by the processor 210 of the server 200 or the processor 340 of electronic device 300. As described with respect to FIGS. 5A and 5B, at a wavelet layer of a neural network, the processor applies a two-dimensional discrete wavelet transform to an image 602 received by the processor. As a result of the wavelet transform applied in the wavelet layer, the processor generates four subbands 604 of the image 602. The processor stacks the subbands along the channel dimension. The processor can further transform the four subbands 604 by applying high and low pass filters to each of the four subbands 604 at another wavelet layer of the neural network. It will be understood that between each wavelet layer of the neural network, the processor can convolve the subbands with filters at one or more convolutional layers, and apply batch normalization or ReLU operations to the convolved subbands before applying the wavelet transform of the next wavelet layer.

As a result of applying the wavelet transform to the subbands 604, subbands 606 are created by the processor, which includes 16 different subbands of the image. Any number of wavelet layers may be used depending on the design of the neural network, with the processor increasing the number of subbands by a factor of four at each wavelet layer. It will also be understood that, depending on the number of filters used in the neural network at the convolutional layers, the number of feature maps or subbands can be different. For example, if after subbands 604 are created the processor convolves each of the subbands at a convolutional layer with multiple filters, then, for example, the convolutional layer could produce eight feature maps from the subbands. After the processor processes the feature maps at the next wavelet layer, the subbands 606 would then include 32 subbands, with the processor creating four subbands being created from each of the eight feature maps. Thus, the dimensional relationship between inputs and outputs of wavelet layers and inverse wavelet layers is H×W× C-H/2×W/2×4C, such that the resolution is reduced by a factor of 2 in H and W, and the channel depth is expanded by a factor of 4 at the wavelet layers.

In the example illustrated in FIG. 6, after the subbands 606 are created by the processor, the processor executes an inverse wavelet layer, creating subbands 608, which are the same subbands as subbands 604 previously created by the processor. The processor at another inverse wavelet applies an inverse wavelet transform on the subbands 608 to create an output image 610. Since the wavelet transforms and inverse wavelet transforms are lossless operations, the output image 610 is an accurate recreation of the input image 602. As described herein, in other neural networks that use pooling layers, since pooling is a lossy operation and calculations are discarded, during upsampling redundant and/or approximated data is used to recreate the image, which results in a lower quality image. The wavelet and inverse wavelet layers of the present disclosure thus provide for an output image 610 of the same quality as the input image 602.

Figure 7:
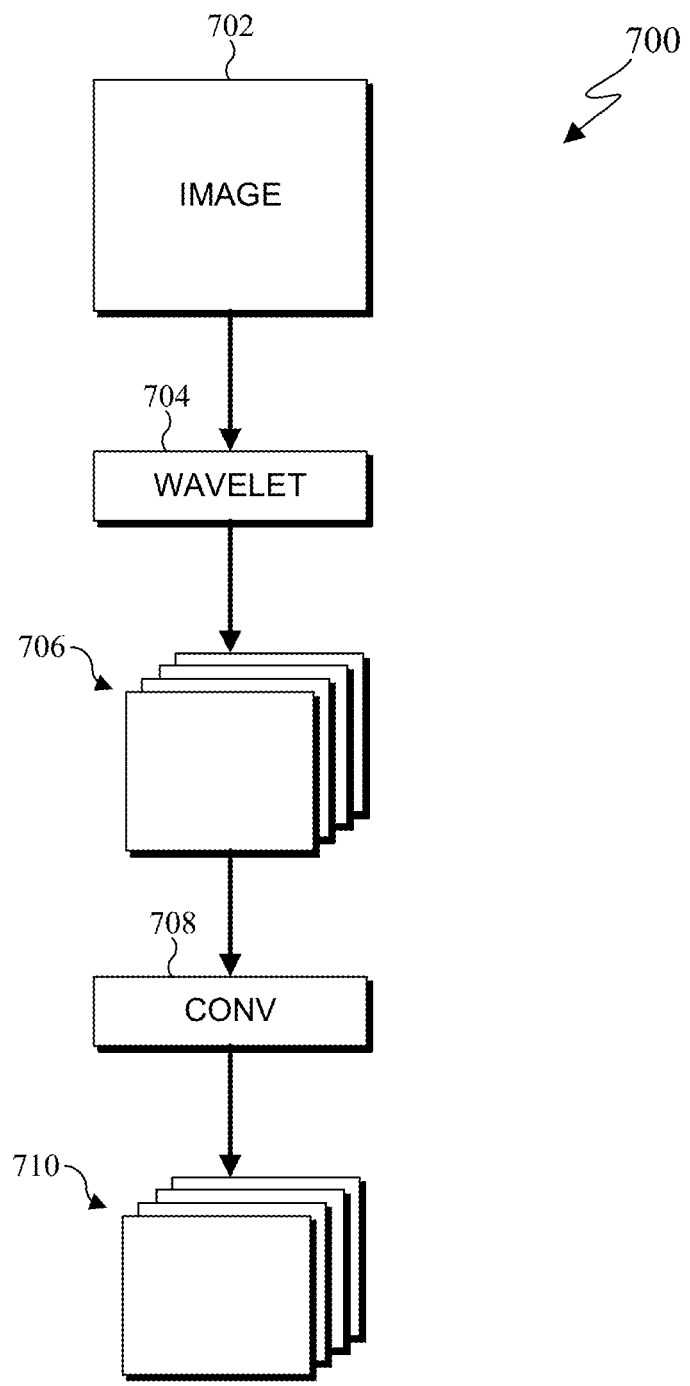
FIG. 7 illustrates a block diagram of an example configuration of a convolutional neural network including wavelet layers in accordance with embodiments of the present disclosure.

FIG. 7 illustrates a block diagram of an example configuration of a convolutional neural network 700 including wavelet layers in accordance with embodiments of the present disclosure. The processor 210 of the server 200 or the processor 340 of electronic device 300 can execute the neural network 700. An image 702 is received by the processor. The processor applies a wavelet transform to the image 702 at a wavelet layer 704, creating a plurality of subbands 706. The processor convolves the plurality of subbands with one or more filters at a convolutional layer 708, creating a plurality of feature maps 710. The number of the plurality of feature maps 710 can depend on the number of filters applied to the subbands 706 by the processor at the convolutional layer 708. For example, if the plurality of subbands 706 includes four subbands and the processor at convolutional layer 708 applies one filter to each subband, the plurality of feature maps 710 includes four feature maps. If the processor applies two filters to each subband, the plurality of feature maps includes eight feature maps, for example.

It will be understood the neural network 700 can include additional wavelet layers or convolutional layers, and that other layers such as Bnorm and ReLU layers can be included, depending on the design of the neural network and the purpose of the neural network. For example, if the neural network 700 is designed to classify objects in an image, the neural network 700 can include additional wavelet and convolutional layers, as well as Bnorm and ReLU layers, to further emphasize features in the image 702 and to further decrease the resolution of the image. The processor can then flatten the feature maps and input the feature maps into one or more fully connected layers at which the processor determines a classification for one or more objects in the image 702. In other embodiments, the neural network 700 can be designed for semantic segmentation that includes one or more inverse wavelet layers, deconvolutional layers, and other layers, for restoring the original resolution of the image 702 and segmenting the output image with the features detected by the processor. It will also be understood that the wavelet layer 704 could come after the convolutional layer 708, such that the processor first convolves the image 702 with one or more filters at the convolutional layer 708, and then the processor at the wavelet layer 704 applies a wavelet transform to the feature maps previously created at the convolutional layer 708.

Figure 8:
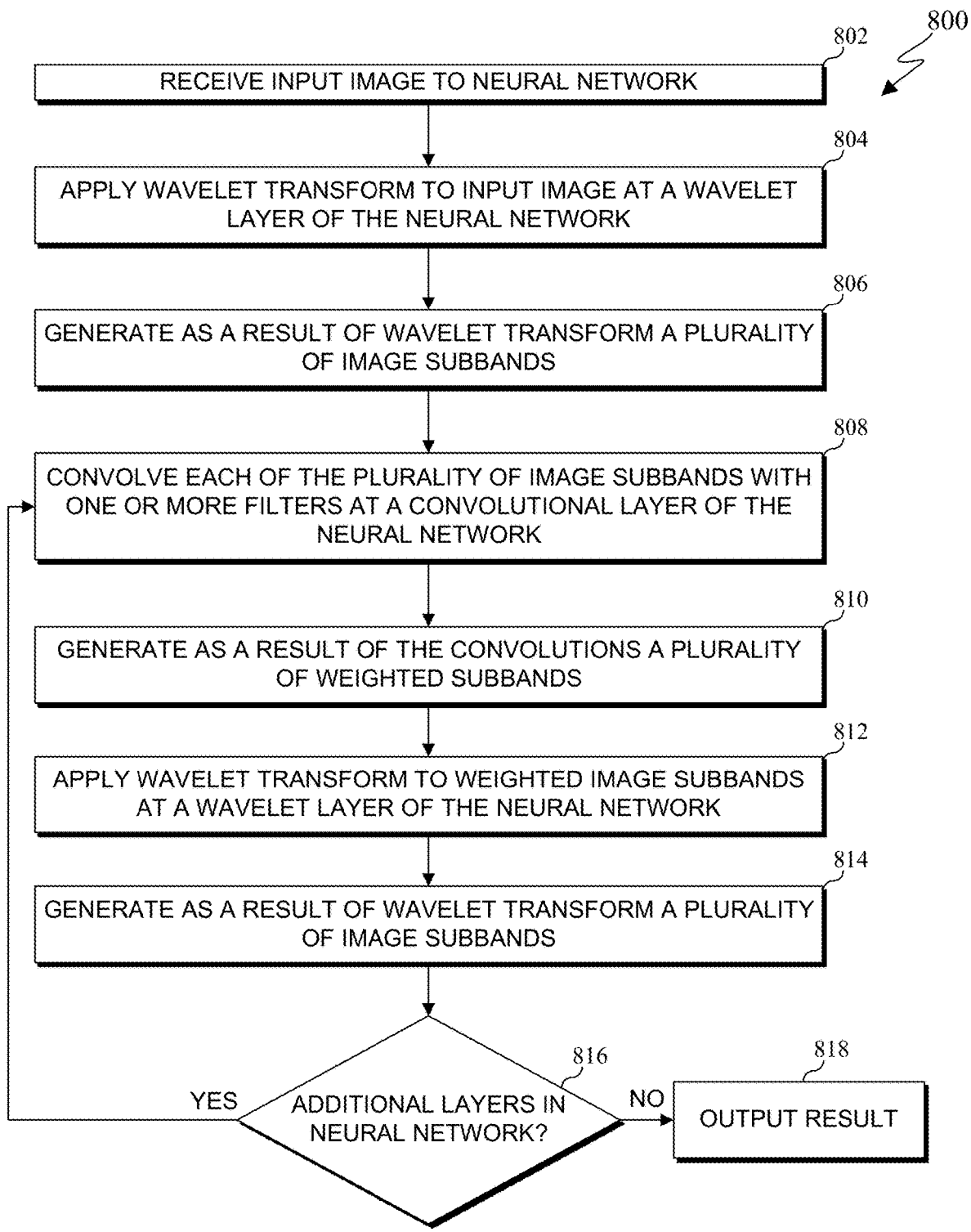
FIG. 8 illustrates a flowchart of an example convolutional neural network process including wavelet layers in accordance with embodiments of the present disclosure.

FIG. 8 illustrates a flowchart of an example convolutional neural network process 800 including wavelet layers in accordance with embodiments of the present disclosure. FIG. 8 does not limit the scope of this disclosure to any particular embodiments. While process 800 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the process 800 is described with respect to processor 210 of the server 200 of FIG. 2 and processor 340 of the electronic device 300 of FIG. 3. However, the process 800 can be used with any other suitable system.

At block 802, the processor receives an input image. At block 804, the processor applies a wavelet transform to the input image at a wavelet layer of the neural network, generating a plurality of image subbands at block 806. At block 808, the processor convolves the plurality of subbands with one or more filters at a convolutional layer, generating a plurality of feature maps or weighted subbands at block 810. The number of the plurality of feature maps can depend on the number of filters applied to the subbands by the processor at the convolutional layer. For example, if the plurality of subbands includes four subbands and the processor at the convolutional layer applies one filter to each subband, the plurality of feature maps includes four feature maps. If the processor applies two filters to each of the four subbands, the plurality of feature maps includes eight feature maps, for example.

At block 812, the processor applies a wavelet transform to the weighted image subbands at another wavelet layer of the neural network, generating another plurality of image subbands at block 814. At decision block 816, the processor determines if there are additional layers in the neural network, and, if so, the processor performs additional convolutions and wavelet transforms at blocks 808-814. If at decision block 816 the processor determines that there are no additional layers in the neural network, the processor outputs a result 818. For example, the processor can output a classification result classifying one or more objects in the image, or other results depending on the design of the neural network.

It will be understood that the process 800 can include additional wavelet layers or convolutional layers, and that other layers such as Bnorm and ReLU layers can be included and executed by the processor, depending on the design of the neural network and the purpose of the neural network. For example, if the neural network is designed to classify objects in an image, the process 800 can include additional wavelet and convolutional layers, as well as Bnorm and ReLU layers, to further emphasize features in the input image and to further decrease the resolution of the input image. The processor can then flatten the feature maps and input the feature maps into one or more fully connected layers at which the processor determines a classification for one or more objects in the input image. In other embodiments, the neural network can be designed for semantic segmentation that includes one or more inverse wavelet layers, deconvolutional layers, and other layers, executed by the processor to restore the original resolution of the input image and segment the output image with the features detected by the processor. It will also be understood that the input image can be convolved with the one or more filters first before a wavelet transform is applied, such that the processor first convolves the image with one or more filters at the convolutional layer, and then the processor at the wavelet layer applies a wavelet transform to the feature maps previously created at the convolutional layer.

Figure 9:
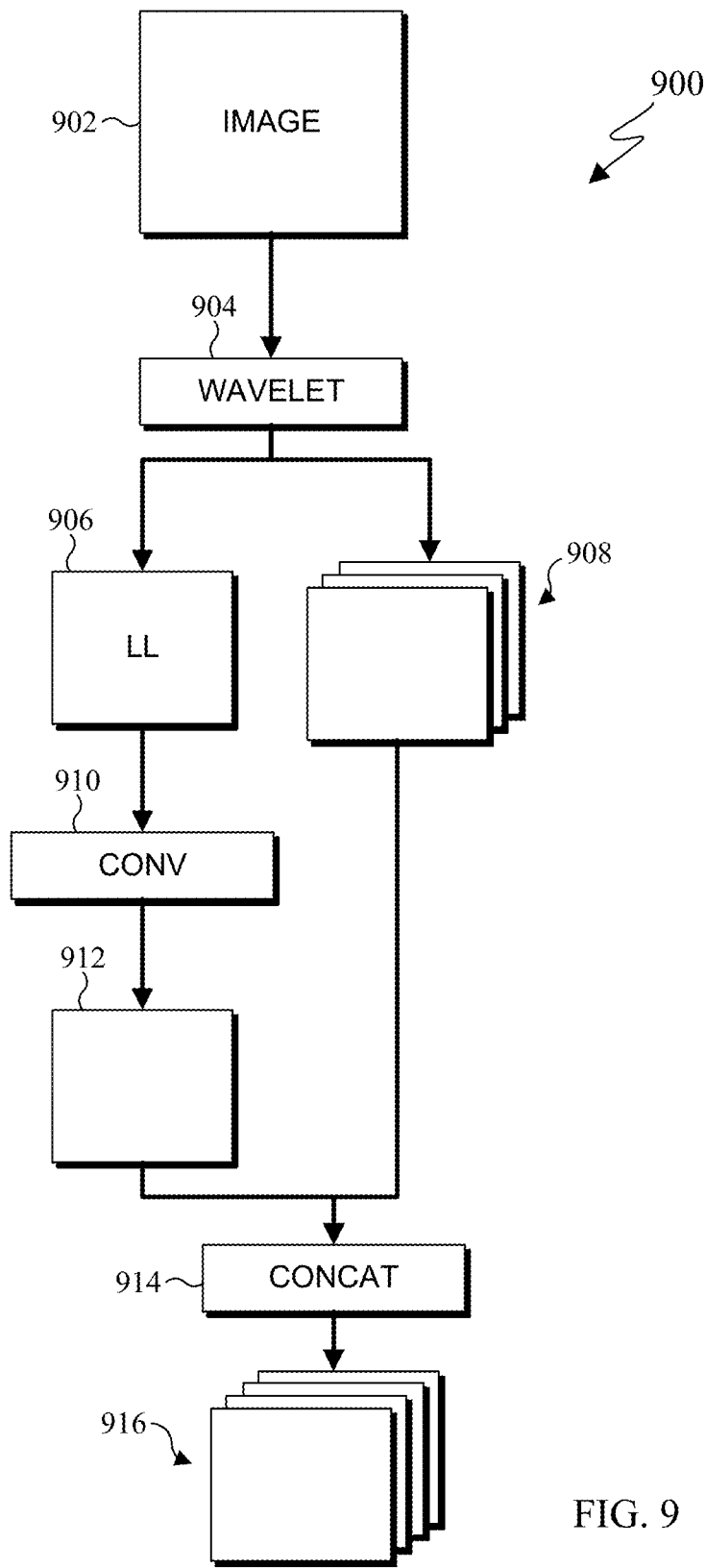
FIG. 9 illustrates a block diagram of an example configuration of a convolutional neural network including wavelet layers in accordance with embodiments of the present disclosure.

FIG. 9 illustrates a block diagram of an example configuration of a convolutional neural network 900 including wavelet layers in accordance with embodiments of the present disclosure. The processor 210 of the server 200 or the processor 340 of electronic device 300 can execute the neural network 900. An image 902 is received by the processor. The processor applies a wavelet transform to the image 902 at a wavelet layer 904, creating a LL subband 906 and a plurality of subbands 908. The plurality of subbands 908 includes HL, HH, and LH subbands. In the example of FIG. 9, the processor convolves the LL subband with one or more filters at a convolutional layer 910, creating one or more feature maps 912, depending on the number of filters applied at the convolutional layer 910. The processor concatenates the plurality of subbands 908 with the one or more feature maps 912 at a concatenation layer 914, the processor creating a plurality of output feature maps 916.

As concatenation can be less resource intensive than performing multiple convolutions, convolving one of the subbands such as the LL subband 906 and concatenating the subband with the other subbands at the concatenation layer 914, rather than convolving all the subbands with filters at a convolutional layer, can result in a more efficient neural network, depending on the design and task to be accomplished by the neural network. For example, if the purpose of the neural network 900 is to detect and classify objects in an image, and output a classification result, concatenation can be used to increase the speed of the neural network. If the neural network is a pixel-to-pixel or semantic segmentation network, all subbands could be convolved at a convolutional layer, such as illustrated in FIG. 7. However, it will be understood that concatenation could be used in pixel-to-pixel, semantic segmentation, or other neural networks, depending on the purpose of the neural network and resources used by the neural network.

It will be understood the neural network 900 can include additional wavelet layers, convolutional layers, or concatenation layers, and that other layers such as Bnorm and ReLU layers can be included, depending on the design of the neural network and the purpose of the neural network. For example, if the neural network 900 is designed to classify objects in an image, the neural network 900 can include additional wavelet, convolutional, and concatenation layers, as well as Bnorm and ReLU layers, to further emphasize features in the image 902 and to further decrease the resolution of the image. The processor can then flatten the feature maps and input the feature maps into one or more fully connected layers at which the processor determines a classification for one or more objects in the image 902.

In other embodiments, the neural network 900 can be designed for semantic segmentation that includes one or more inverse wavelet layers, deconvolutional layers, and other layers, for restoring the original resolution of the image 902 and segmenting the output image with the features detected by the neural network 900. It will also be understood that the wavelet layer 904 could come after the convolutional layer 910, such that processor first convolves the image 902 with one or more filters at the convolutional layer 910, and then the processor at the wavelet layer 904 applies a wavelet transform to the feature maps previously created at the convolutional layer 910. The processor could then pass the LL subband 906 to another convolutional layer before concatenation.

Figure 10:
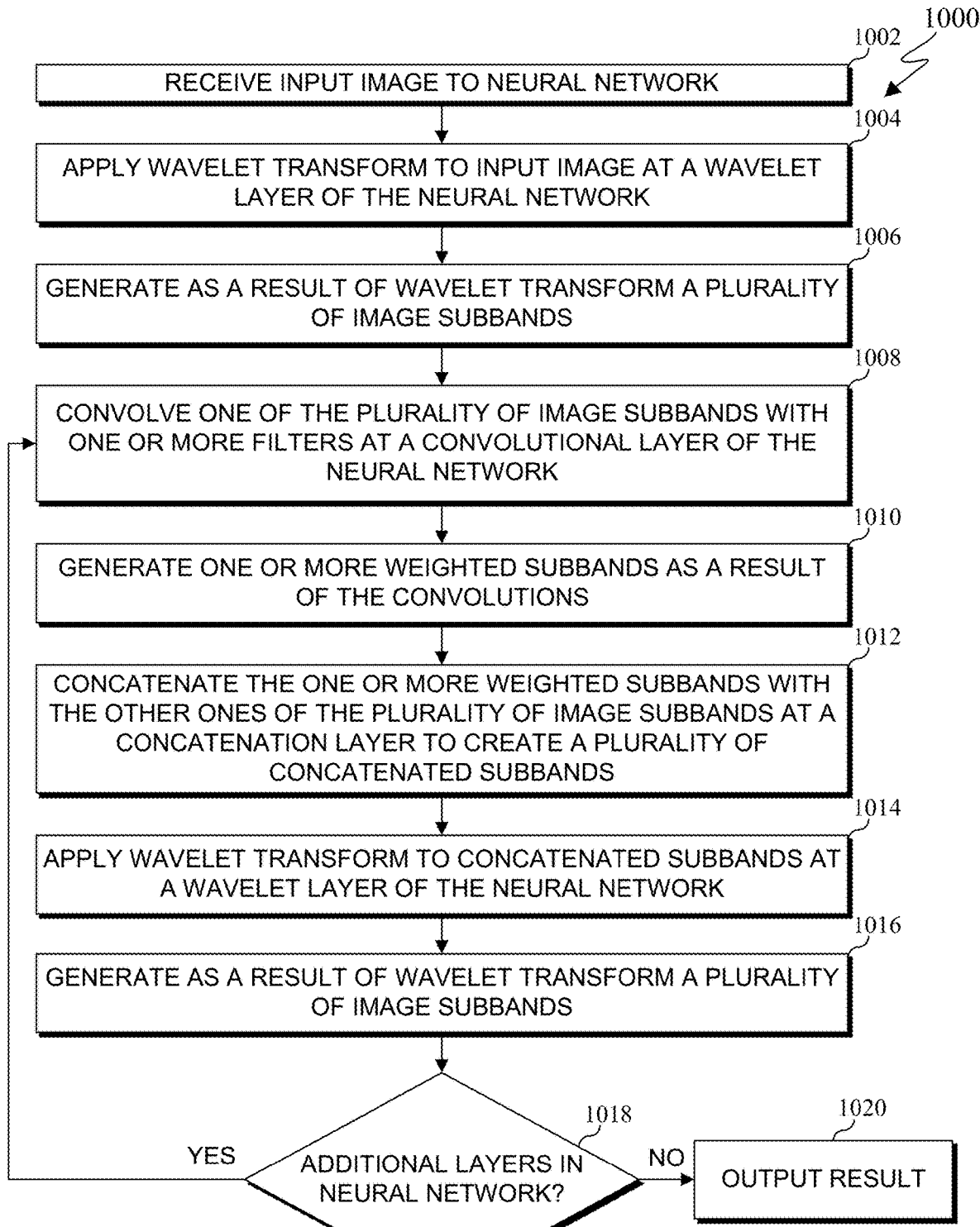
FIG. 10 illustrates a flowchart of an example convolutional neural network process including wavelet layers in accordance with embodiments of the present disclosure.

FIG. 10 illustrates a flowchart of an example convolutional neural network process 1000 including wavelet layers in accordance with embodiments of the present disclosure. FIG. 10 does not limit the scope of this disclosure to any particular embodiments. While process 1000 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the process 1000 is described with respect to processor 210 of the server 200 of FIG. 2 and processor 340 of the electronic device 300 of FIG. 3. However, the process 1000 can be used with any other suitable system.

At block 1002, the processor receives an input image. At block 1004, the processor applies a wavelet transform to the input image at a wavelet layer of the neural network, generating a plurality of image subbands at block 1006. At block 1008, the processor convolves one of the plurality of subbands, such as the LL subband, with one or more filters at a convolutional layer, generating one or more feature maps or weighted subbands at block 1010. At block 1012, the processor concatenates the one or more weighted subbands with the other ones of the plurality of image subbands at a concatenation layer to create a plurality of concatenated subbands. The number of the plurality of feature maps or concatenated subbands can depend on the number of filters applied to the subband by the processor at the convolutional layer. For example, if the processor at the convolutional layer applies one filter to the subband, the one or more feature maps includes one feature map. If the processor applies four filters to the subband, the one or more feature maps include four feature maps, for example.

At block 1014, the processor applies a wavelet transform to the concatenated subbands at another wavelet layer of the neural network, generating another plurality of image subbands at block 1016. At decision block 1018, the processor determines if there are additional layers in the neural network, and, if so, the processor performs additional convolutions, concatenations, and wavelet transforms at blocks 1008-1016. If at decision block 1018 the processor determines that there are no additional layers in the neural network, the processor outputs a result. For example, the processor can output a classification result classifying one or more objects in the image, or other results depending on the design of the neural network.

It will be understood that the process 1000 can include additional wavelet layers, convolutional layers, or concatenation layers, and that other layers such as Bnorm and ReLU layers can be included and executed by the processor, depending on the design of the neural network and the purpose of the neural network. For example, if the neural network is designed to classify objects in an image, the process 1000 can include additional wavelet, convolutional, and concatenation layers, as well as Bnorm and ReLU layers, to further emphasize features in the input image and to further decrease the resolution of the input image. The processor can then flatten the feature maps and input the feature maps into one or more fully connected layers at which the processor determines a classification for one or more objects in the input image. In other embodiments, the neural network can be designed for semantic segmentation that includes one or more inverse wavelet layers, deconvolutional layers, and other layers, executed by the processor to restore the original resolution of the input image and segment the output image with the features detected by the processor. It will also be understood that the input image can be convolved with the one or more filters first before a wavelet transform is applied, such that processor first convolves the image with one or more filters at the convolutional layer, and then the processor at the wavelet layer applies a wavelet transform to the feature maps previously created at the convolutional layer. The processor could then pass a subband, such as the LL subband, to another convolutional layer before concatenation.

Figure 11:
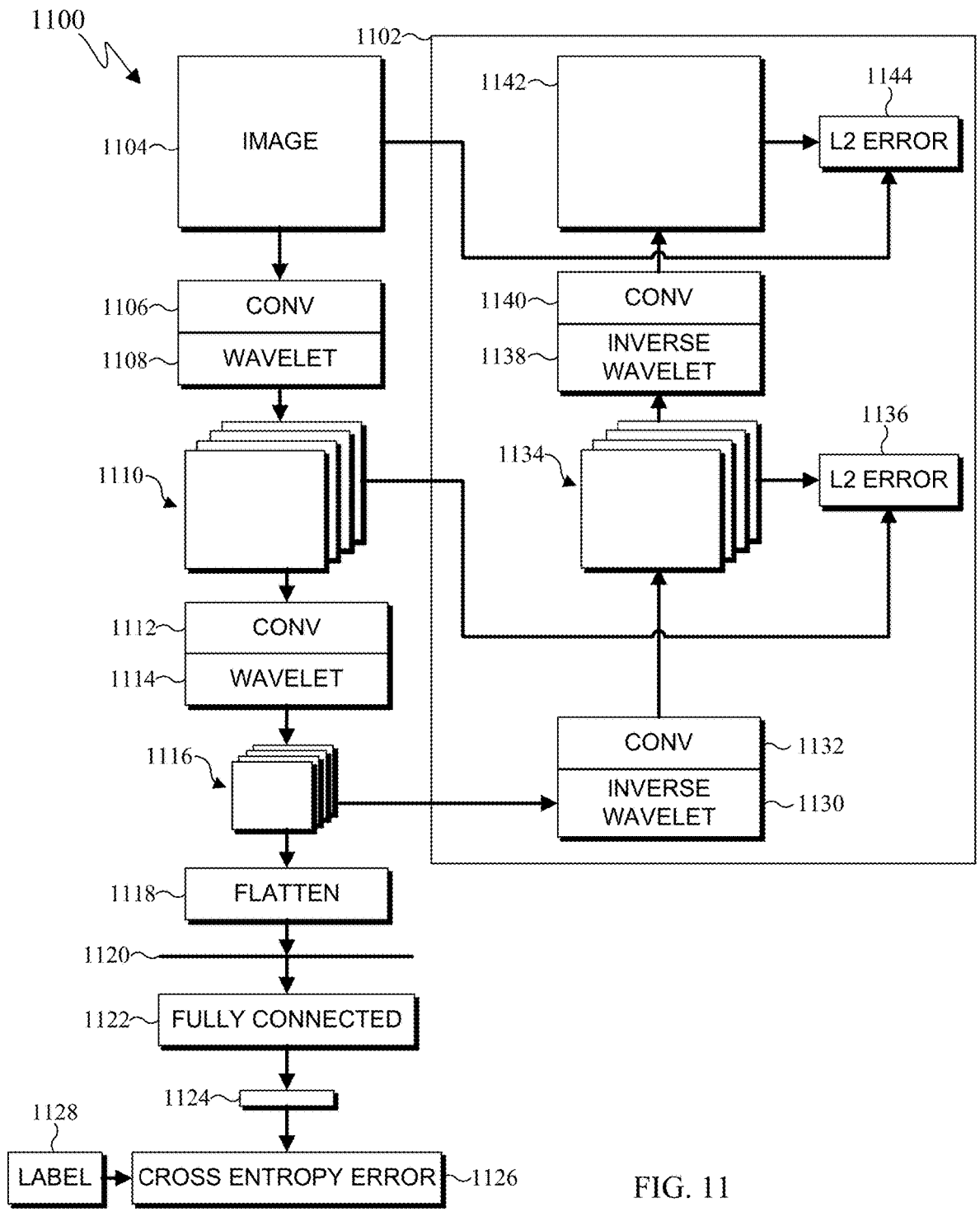
FIG. 11 illustrates a block diagram of an example neural network including an auxiliary encoder for feature visualization in accordance with embodiments of the present disclosure.

FIG. 11 illustrates a block diagram of an example neural network 1100 including an auxiliary encoder 1102 for feature visualization in accordance with embodiments of the present disclosure. The processor 210 of the server 200 or the processor 340 of electronic device 300 can execute the neural network 1100. The neural network 1100 can be a network for classifying objects detected in images. For example, the neural network 1100 can be configured to detect handwritten digits in an image 1104 received by the processor. The processor convolves the image 1104 with one or more filters at a convolutional layer 1106. The processor applies a wavelet transform to one or more feature maps at a wavelet layer 1108, creating a plurality of subbands 1110. The number of the plurality of subbands 1110 can depend on the number of filters applied to the image 1104 by the processor at the convolutional layer 1106. The processor convolves the plurality of subbands with one or more filters at another convolutional layer 1112, and applies a wavelet transform to one or more feature maps at another wavelet layer 1114, creating a plurality of subbands 1116. The number of the plurality of subbands 1116 can depend on the number of filters applied in the previous layers.

The processor can execute any number of additional convolutional and wavelet layers depending on the design and purpose of the neural network 1100. The neural network 1100 could also include concatenation layers, such as that described with respect to FIGS. 9 and 10. It will be understood that the wavelet layer 1108 could come before the convolutional layer 1106, such that processor first separates the image 1104 into subbands before convolving the subbands with one or more filters at the convolutional layer 1106. It will be understood the neural network 1100 can include other layers such as Bnorm and ReLU layers, depending on the design of the neural network and the purpose of the neural network. Once the processor executes all the convolutional and wavelet layers in the neural network 1100, the processor flattens the feature maps at block 1118 into an input vector 1120 and inputs the input vector into one or more fully connected layers 1122 to generate an output vector 1124. At block 1126 the processor can perform a cross entropy error function on the output vector 1124 to, for example, define the loss function for network training. The processor can apply one or more labels 1128 to the output result of the neural network 1100 to classify the result. For example, if the neural network 1100 is designed to recognize hand-written digits between 0 and 9, the output vector may include 10 values between 0 and 1, each representing a probability for each of the digits 0-9. For example, an output vector with values [0, 0, 0.1, 0, 0.3, 0, 0, 0, 0, 0.6] indicates a 10% probability that the image 1104 includes a 2, a 30% probability that the image 1104 includes a 4, and a 60% probability that the image 1104 includes a 9. In this case, the processor can label the output as a 9, as the 9 digit has the highest probability.

The neural network 1100 includes an auxiliary encoder 1102 as a separate branch of the neural network 1100. The auxiliary encoder 1102 can be used to output an image emphasizing the features that caused the processor executing the neural network 1100 to reach the output result. The auxiliary encoder 1102 projects the feature maps at each depth back to the input image resolution so that patterns the neural network has learned can be visualized. The processor applies an inverse wavelet transform to the plurality of subbands 1116, or to the subbands created at a subsequent layer if the neural network 1100 includes additional layers, at an inverse wavelet layer 1130 to merge the subbands and convolves the subbands at a convolutional layer 1132 to create a plurality of higher resolution subbands 1134. The plurality of higher resolution subbands 1134 correspond to the subbands 1110 in the example illustrated in FIG. 11. The processor then performs L2 regularization on the plurality of higher resolution subbands 1134 and on the plurality of subbands 1110 at block 1136.

Figure 12:
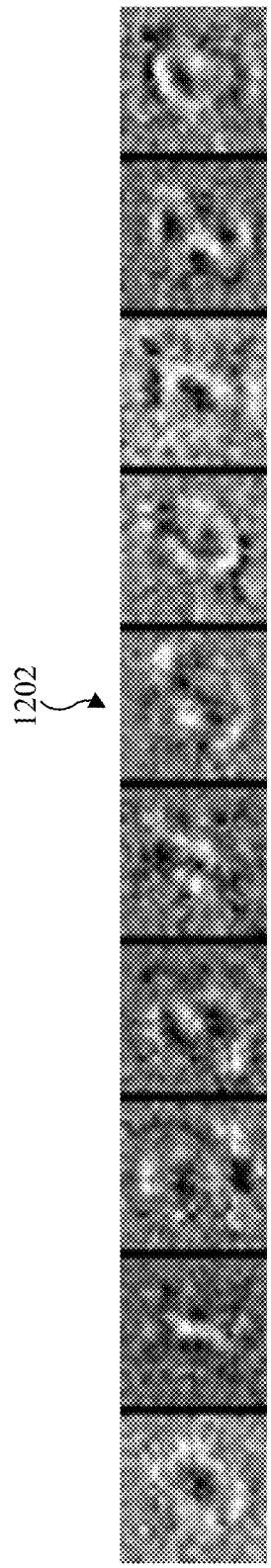
FIG. 12 illustrates a series of example auxiliary encoder output images in accordance with embodiments of the present disclosure.

The processor applies another inverse wavelet transform to the plurality of higher resolution subbands 1134 at an inverse wavelet layer 1138, to merge the subbands, and convolves the subbands at convolutional layer 1140 to create an image 1142 at the original resolution of image 1104. The processor then performs L2 regularization on the image 1104 and the image 1142 at block 1144. The image 1142 includes the original image, with emphasized features of the original image that caused the processor to output the result. For instance, in the example where the neural network 1100 is configured to recognize hand-written digits between 0 and 9, once the neural network training is complete, the processor can back-propagate vectors through the auxiliary encoder branch 1102 of the neural network 1100 to output a visualization of the important features of the input image. For example, the processor can back-propagate a vector of [1, 0, 0, 0, 0, 0, 0, 0, 0, 0] to provide a visualization for the digit 0. FIG. 12 illustrates a series of example auxiliary encoder output images 1202 for each of digits 0 through 9, if 10 vectors for each associated with one of the digits are back-propagated through the encoder branch 1102. As shown in FIG. 12, each of the series of images 1202 includes white sections and darker sections. The white sections indicate areas where features indicating the digit are present, and the darker sections indicate areas where no content is detected that causes the processor determine the image is of a certain digit. The auxiliary encoder 1102 thus can be used both to test and optimize a neural network, and to output images indicating detected feature areas, which can be useful for applications such as semantic segmentation.

Figure 13A:
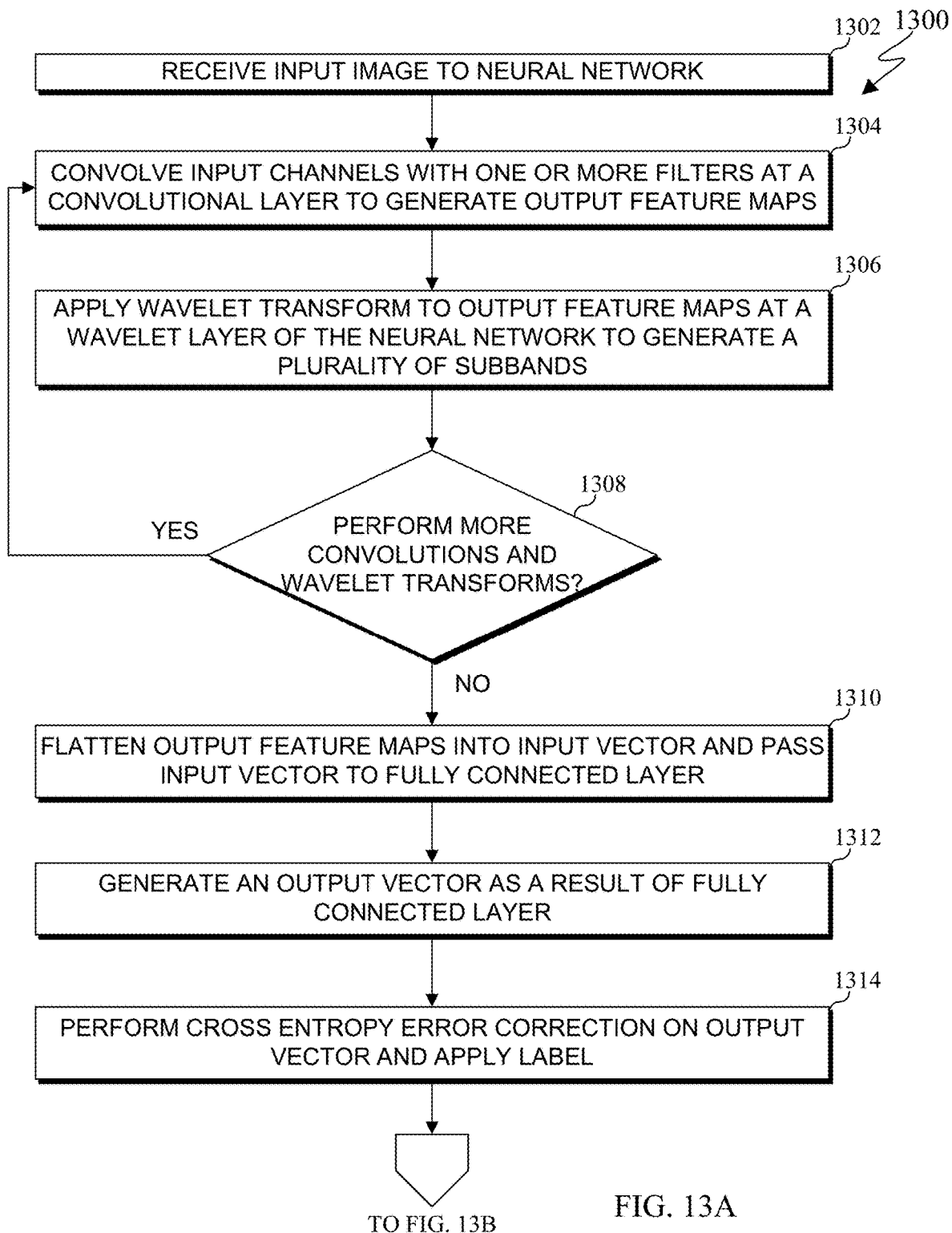
FIGS. 13A and 13B illustrate a flowchart of an example wavelet layer convolutional neural network and auxiliary encoder process in accordance with embodiments of the present disclosure.
Figure 13B:
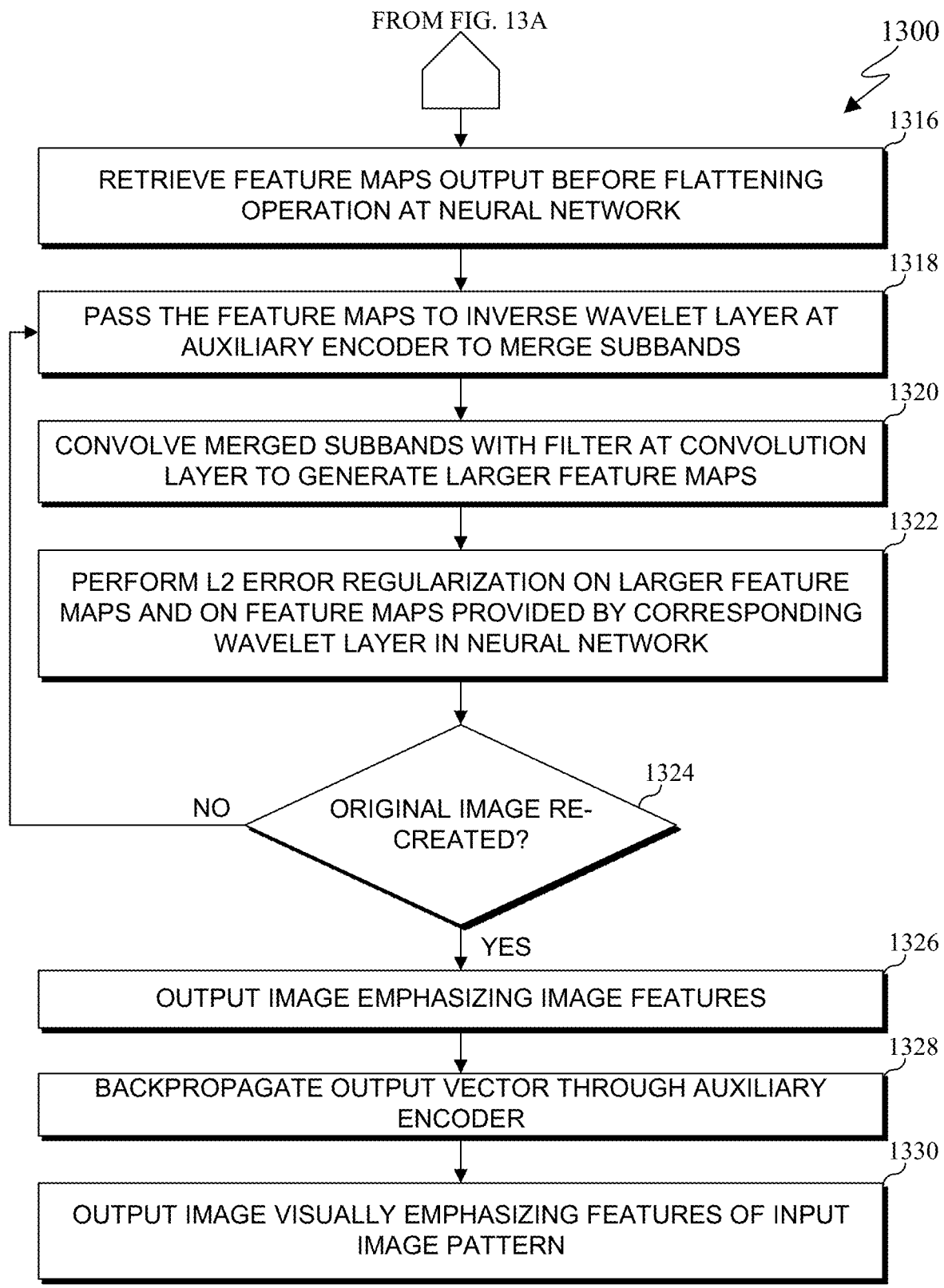

FIGS. 13A and 13B illustrate a flowchart of an example wavelet layer convolutional neural network and auxiliary encoder process 1300 in accordance with embodiments of the present disclosure. FIGS. 13A and 13B do not limit the scope of this disclosure to any particular embodiments. While process 1300 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the process 1300 is described with respect to processor 210 of the server 200 of FIG. 2 and processor 340 of the electronic device 300 of FIG. 3. However, the process 1300 can be used with any other suitable system.

The neural network with respect to process 1300 can be a network for classifying objects detected in images. For example, the neural network can be configured to detect handwritten digits in an image received by the processor. At block 1302, the processor receives an input image to the neural network. At block 1304, the processor convolves one or more input channels of the input image with one or more filters at a convolutional layer to generate one or more output feature maps. At block 1306, the processor applies a wavelet transform to the one or more feature maps at a wavelet layer, creating a plurality of subbands. The number of the plurality of subbands can depend on the number of filters applied to the image by the processor at the convolutional layer. At decision block 1308, the processor determines if there are additional convolutional or wavelet layers in the neural network. If so, the processor executes blocks 1304 and 1306 to convolve the plurality of subbands with one or more filters at another convolutional layer, and to apply a wavelet transform to one or more feature maps at another wavelet layer, creating another plurality of subbands.

The processor can execute any number of additional convolutional and wavelet layers depending on the design and purpose of the neural network. The neural network can also include concatenation layers such as that described with respect to FIGS. 9 and 10. It will be understood that the wavelet layer could come before the convolutional layer, such that the processor first separates the image into subbands before convolving the subbands with one or more filters at the convolutional layer. It will be understood the neural network can include other layers such as Bnorm and ReLU layers, depending on the design of the neural network and the purpose of the neural network. The processor loops the process 1300 at blocks 1304-1308 until the processor executes all convolutional and wavelet layers in the neural network. Once the processor executes all the convolutional and wavelet layers in the neural network, at block 1310 the processor flattens the feature maps into an input vector and inputs the input vector into one or more fully connected layers, generating an output vector at block 1312. At block 1314, the processor can perform a cross entropy error function on the output vector. The processor can also apply one or more labels to the output result of the neural network to classify the result. For example, if the neural network is designed to recognize hand-written digits between 0 and 9, the output vector may include 10 values between 0 and 1, each representing a probability for each of the digits 0-9.

The neural network of the process 1300 includes an auxiliary encoder that can be used to output an image emphasizing the features that caused the processor to reach the output result. At block 1316, the processor retrieves the feature maps output before the flattening operation performed at block 1310. The processor applies an inverse wavelet transform to the feature maps at an inverse wavelet layer of the auxiliary encoder branch of the neural network, to merge the subbands, and, at block 1320, convolves the subbands at a convolutional layer to create a plurality of higher resolution subbands. At block 1322, the processor performs L2 regularization on the plurality of higher resolution subbands and on the feature maps of the corresponding wavelet layer of the neural network, where the corresponding wavelet layer is the wavelet layer that produced subbands of the same resolution as the features maps created at block 1320. At decision block 1324, the processor determines if the processor has recreated the original image at the original resolution.

If not, the process 1300 loops back to blocks 1318-1324, where the processor applies another inverse wavelet transform to the plurality of higher resolution subbands at an inverse wavelet layer, convolves the subbands at a convolutional layer and performs L2 regularization on the plurality of higher resolution subbands and on the feature maps of the corresponding wavelet layer of the neural network. If at block 1322 the original image has been recreated, the processor performs L2 regularization on the recreated image and on the input image. If at decision block 1324 the processor determines that, as a result of the inverse wavelet transforms and the convolutions, the processor has recreated the original image, at block 1326 the processor outputs the image emphasizing detected features in the image, as described herein with respect to FIGS. 11 and 12.

Once the network is trained, at block 1328, the processor can back-propagate a vector through the auxiliary encoder branch of the neural network to output at block 1330 a visualization of the features that the network is trained to detect to reach that particular result. In the example herein in which the neural network is configured to recognize hand-written digits between 0 and 9, the processor can back-propagate a vector of [1, 0, 0, 0, 0, 0, 0, 0, 0, 0] to provide a visualization for the digit 0. As shown in FIG. 12, each of the series of images 1202 includes white section and darker sections. The white sections indicate areas where content indicating the digit is present, and the darker sections indicate areas where no content is detected. The auxiliary encoder thus can be used both to test and optimize a network based, and to output images indicating detected areas, which can be useful for applications such as semantic segmentation.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. An electronic device, comprising:
   a memory; and
   at least one processor coupled to the memory, the at least one processor configured to:
   receive input image data to a neural network;
   apply a wavelet transform to the input image data at a wavelet layer of the neural network;
   generate a plurality of subbands of the input image data as a result of the wavelet transform;
   determine a classification prediction using the plurality of subbands;
   provide the plurality of subbands to an auxiliary encoder branch of the neural network; and
   generate, using the auxiliary encoder branch of the neural network, an output that is separate from the classification prediction and that visually emphasizes one or more features of the input image data that caused the determination of the classification prediction over other features of the input image data;
   wherein, to generate the output that visually emphasizes the one or more features of the input image data that caused the determination of the classification prediction over the other features of the input image data, the at least one processor is configured to:

to optimize the neural network, (i) apply a first regularization using a plurality of higher resolution subbands created by the auxiliary encoder branch and at least a portion of the plurality of subbands that correspond to the higher resolution subbands and (ii) apply a second regularization using other image data created by the auxiliary encoder branch and the input image data received by the neural network; and backpropagate, through the auxiliary encoder branch and after the optimization of the neural network, at least one one-hot vector associated with the classification prediction and a feature for detection to visually emphasize the one or more features of the input image data over the other features of the input image data.

2. The electronic device of claim 1, wherein the at least one processor is further configured to:

perform convolutions on each of the plurality of subbands using one or more filters at a convolutional layer of the neural network; and generate one or more feature maps as a result of the convolutions.

3. The electronic device of claim 2, wherein the at least one processor is further configured to:

perform deconvolutions on the one or more feature maps at one or more deconvolutional layers included in the auxiliary encoder branch of the neural network; and apply an inverse wavelet transform to the one or more feature maps at one or more inverse wavelet layers included in the auxiliary encoder branch of the neural network.

4. The electronic device of claim 3, wherein:

to determine the classification prediction, the at least one processor is configured to detect the one or more features of the input image data using the one or more feature maps; and the generation of the output that visually emphasizes the one or more features of the input image data is based on a result of performing the deconvolutions and applying the inverse wavelet transform to the one or more feature maps.

5. The electronic device of claim 3, wherein the at least one processor is configured to apply the first regularization after each application of the inverse wavelet transform and performance of each deconvolution.

6. The electronic device of claim 1, wherein the plurality of subbands includes a low-low (LL) subband, a low-high (LH) subband, a high-low (HL) subband, and a high-high (HH) subband.

7. The electronic device of claim 6, wherein the at least one processor is further configured to:

perform one or more convolutions on the LL subband using one or more filters at a convolutional layer;

generate one or more weighted subbands as a result of the one or more convolutions; and concatenate the one or more weighted subbands with the LH subband, the HL subband, and the HH subband.

8. A method of a neural network, comprising:

receiving input image data to the neural network;

applying a wavelet transform to the input image data at a wavelet layer of the neural network;

generating a plurality of subbands of the input image data as a result of the wavelet transform;

determining a classification prediction using the plurality of subbands;

providing the plurality of subbands to an auxiliary encoder branch of the neural network; and generating, using the auxiliary encoder branch of the neural network, an output that is separate from the classification prediction and that visually emphasizes one or more features of the input image data that caused the determination of the classification prediction over other features of the input image data;

wherein generating the output that visually emphasizes the one or more features of the input image data that caused the determination of the classification prediction over the other features of the input image data comprises:

to optimize the neural network, (i) applying a first regularization using a plurality of higher resolution subbands created by the auxiliary encoder branch and at least a portion of the plurality of subbands that correspond to the higher resolution subbands and (ii) applying a second regularization using other image data created by the auxiliary encoder branch and the input image data received by the neural network; and backpropagating, through the auxiliary encoder branch and after the optimization of the neural network, at least one one-hot vector associated with the classification prediction and a feature for detection to visually emphasize the one or more features of the input image data over the other features of the input image data.

9. The method of claim 8, further comprising:

performing convolutions on each of the plurality of subbands using one or more filters at a convolutional layer of the neural network; and generating one or more feature maps as a result of the convolutions.

10. The method of claim 9, further comprising:

performing deconvolutions on the one or more feature maps at one or more deconvolutional layers included in the auxiliary encoder branch of the neural network; and applying an inverse wavelet transform to the one or more feature maps at one or more inverse wavelet layers included in the auxiliary encoder branch of the neural network.

11. The method of claim 10, wherein:

determining the classification prediction includes detecting the one or more features of the input image data using the one or more feature maps; and the generation of the output that visually emphasizes the one or more features of the input image data is based on a result of performing the deconvolutions and applying the inverse wavelet transform to the one or more feature maps.

12. The method of claim 10, wherein the first regularization is applied after each application of the inverse wavelet transform and performance of each deconvolution.

13. The method of claim 8, wherein the plurality of subbands includes a low-low (LL) subband, a low-high (LH) subband, a high-low (HL) subband, and a high-high (HH) subband.

14. The method of claim 13, further comprising:

performing one or more convolutions on the LL subband using one or more filters at a convolutional layer;

generating one or more weighted subbands as a result of the one or more convolutions; and concatenating the one or more weighted subbands with the LH subband, the HL subband, and the HH subband.

15. A non-transitory computer readable medium embodying a computer program for operating an electronic device including a memory and at least one processor, the computer program comprising computer readable program code that, when executed by the at least one processor, causes the electronic device to:
- receive input image data to a neural network;
- apply a wavelet transform to the input image data at a wavelet layer of the neural network;
- generate a plurality of subbands of the input image data as a result of the wavelet transform;
- determine a classification prediction using the plurality of subbands;
- provide the plurality of subbands to an auxiliary encoder branch of the neural network; and
- generate, using the auxiliary encoder branch of the neural network, an output that is separate from the classification prediction and that visually emphasizes one or more features of the input image data that caused the determination of the classification prediction over other features of the input image data;
- wherein the computer readable program code that when executed causes the electronic device to generate the output that visually emphasizes the one or more features of the input image data that caused the determination of the classification prediction over the other features of the input image data comprises computer readable program code that when executed causes the electronic device to:
  - to optimize the neural network, (i) apply a first regularization using a plurality of higher resolution subbands created by the auxiliary encoder branch and at least a portion of the plurality of subbands that correspond to the higher resolution subbands and (ii) apply a second regularization using other image data created by the auxiliary encoder branch and the input image data received by the neural network; and
  - backpropagate, through the auxiliary encoder branch and after the optimization of the neural network, at least one one-hot vector associated with the classification prediction and a feature for detection to visually emphasize the one or more features of the input image data over the other features of the input image data.

16. The non-transitory computer readable medium of claim 15, wherein the computer program further comprises computer readable program code that, when executed by the at least one processor, causes the electronic device to:
- perform convolutions on each of the plurality of subbands using one or more filters at a convolutional layer of the neural network; and
- generate one or more feature maps as a result of the convolutions.

17. The non-transitory computer readable medium of claim 16, wherein the computer program further comprises computer readable program code that, when executed by the at least one processor, causes the electronic device to:
- perform deconvolutions on the one or more feature maps at one or more deconvolutional layers included in the auxiliary encoder branch of the neural network; and
- apply an inverse wavelet transform to the one or more feature maps at one or more inverse wavelet layers included in the auxiliary encoder branch of the neural network.

18. The non-transitory computer readable medium of claim 17, wherein:
- the computer program further comprises computer readable program code that, when executed by the at least one processor, causes the electronic device to detect the one or more features of the input image data using the one or more feature maps; and
- the generation of the output that visually emphasizes the one or more features of the input image data is based on a result of performing the deconvolutions and applying the inverse wavelet transform to the one or more feature maps.

19. The non-transitory computer readable medium of claim 15, wherein the plurality of subbands includes a low-low (LL) subband, a low-high (LH) subband, a high-low (HL) subband, and a high-high (HH) subband.

20. The non-transitory computer readable medium of claim 19, wherein the computer program further comprises computer readable program code that, when executed by the at least one processor, causes the electronic device to:
- perform one or more convolutions on the LL subband using one or more filters at a convolutional layer;
- generate one or more weighted subbands as a result of the one or more convolutions; and
- concatenate the one or more weighted subbands with the LH subband, the HL subband, and the HH subband.

* * * * *